(12) United States Patent
Choksi

(10) Patent No.: US 7,702,346 B2
(45) Date of Patent: *Apr. 20, 2010

(54) SYSTEM AND METHOD FOR FACILITATING ROAMING OF PUSH TO TALK SUBSCRIBERS ACROSS DISPARATE DISPATCH NETWORKS

(75) Inventor: Ojas Thakor Choksi, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 1253 days.

This patent is subject to a terminal disclaimer.

(21) Appl. No.: 11/223,840

(22) Filed: Sep. 9, 2005

(65) Prior Publication Data

US 2006/0058008 A1 Mar. 16, 2006

Related U.S. Application Data

(63) Continuation-in-part of application No. 11/047,897, filed on Feb. 1, 2005, now Pat. No. 7,359,726, and a continuation-in-part of application No. 11/047,892, filed on Feb. 1, 2005, now Pat. No. 7,359,731.

(60) Provisional application No. 60/608,113, filed on Sep. 9, 2004, provisional application No. 60/608,131, filed on Sep. 9, 2004, provisional application No. 60/608,117, filed on Sep. 9, 2004, provisional application No. 60/608,126, filed on Sep. 9, 2004, provisional application No. 60/608,110, filed on Sep. 9, 2004.

(51) Int. Cl.
| | |
|---|---|
| H04B 7/00 | (2006.01) |
| H04M 11/00 | (2006.01) |
| H04M 1/00 | (2006.01) |
| H04H 20/71 | (2008.01) |
| H04B 7/216 | (2006.01) |
| H04W 4/00 | (2009.01) |
| H04M 11/04 | (2006.01) |
| H04M 15/00 | (2006.01) |

(52) U.S. Cl. .................. 455/518; 455/406; 455/519; 455/552.1; 370/312; 370/335; 370/338; 379/45; 379/115.01; 379/121.02

(58) Field of Classification Search .............. 455/405, 455/406, 419, 427, 432.1, 450, 457, 508, 455/517, 518, 519, 520, 404.2, 416, 422.1, 455/428, 466, 552.1, 521; 370/352, 252, 370/312, 328, 335, 338, 389, 401, 470, 466, 370/260, 410; 379/121.02, 392, 45, 115.01, 379/115.02, 114.01, 114.02

See application file for complete search history.

(56) References Cited

U.S. PATENT DOCUMENTS 5,483,575 A * 1/1996 Zdanowski et al. ......... 455/508

(Continued)

OTHER PUBLICATIONS

Apr. 18, 2006, International Search Report.

*Primary Examiner*—Nay A Maung
*Assistant Examiner*—Paul P Tran

(57) ABSTRACT

An inter-working network facilitating PTT communications among roaming subscribers spanning a plurality of disparate dispatch networks includes a signaling controller, a media gateway, a system for facilitating the monetization of inter-carrier dispatch communications and a group management server. The signaling controller and media gateway generate dispatch call records for dispatch sessions facilitated through the inter-working network. The system includes a billing accumulator and a settlement entity. The billing accumulator is interfaced with the inter-working network and includes logic to receive and store the dispatch call data records from the inter-working architecture. The settlement entity is interfaced with the billing accumulator, and includes settlement logic for converting each stored dispatch call data record to a billing record for each of at least two of the dispatch networks. The group management server is interfaced with group management servers in each of the dispatch networks.

17 Claims, 27 Drawing Sheets

U.S. PATENT DOCUMENTS

| | | | |
|---|---|---|---|
| 6,021,326 A | 2/2000 | Nguyen | 455/422 |
| 6,304,558 B1 * | 10/2001 | Mysore | 370/312 |
| 6,564,049 B1 * | 5/2003 | Dailey | 455/416 |
| 6,775,267 B1 * | 8/2004 | Kung et al. | 370/352 |
| 7,184,746 B2 * | 2/2007 | Barclay et al. | 455/404.2 |
| 7,328,042 B2 * | 2/2008 | Choksi | 455/552.1 |
| 7,359,726 B2 * | 4/2008 | Choksi | 455/519 |
| 2004/0032843 A1 * | 2/2004 | Schaefer et al. | 370/338 |
| 2004/0174900 A1 * | 9/2004 | Volpi et al. | 370/466 |
| 2004/0258028 A1 * | 12/2004 | Hossain et al. | 370/335 |
| 2005/0111630 A1 * | 5/2005 | Potorny et al. | 379/45 |
| 2005/0221819 A1 | 10/2005 | Patel et al. | 455/432.1 |

* cited by examiner

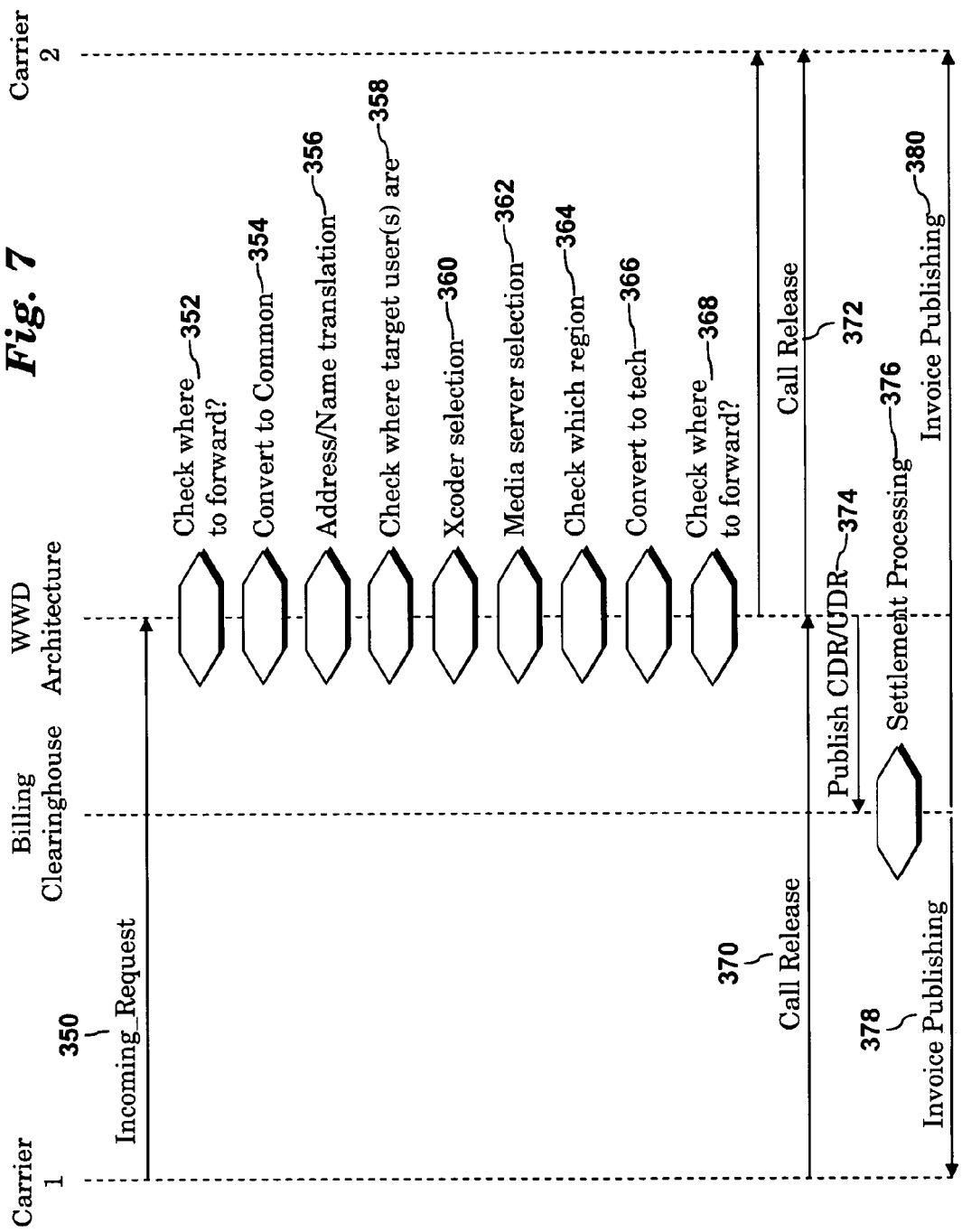

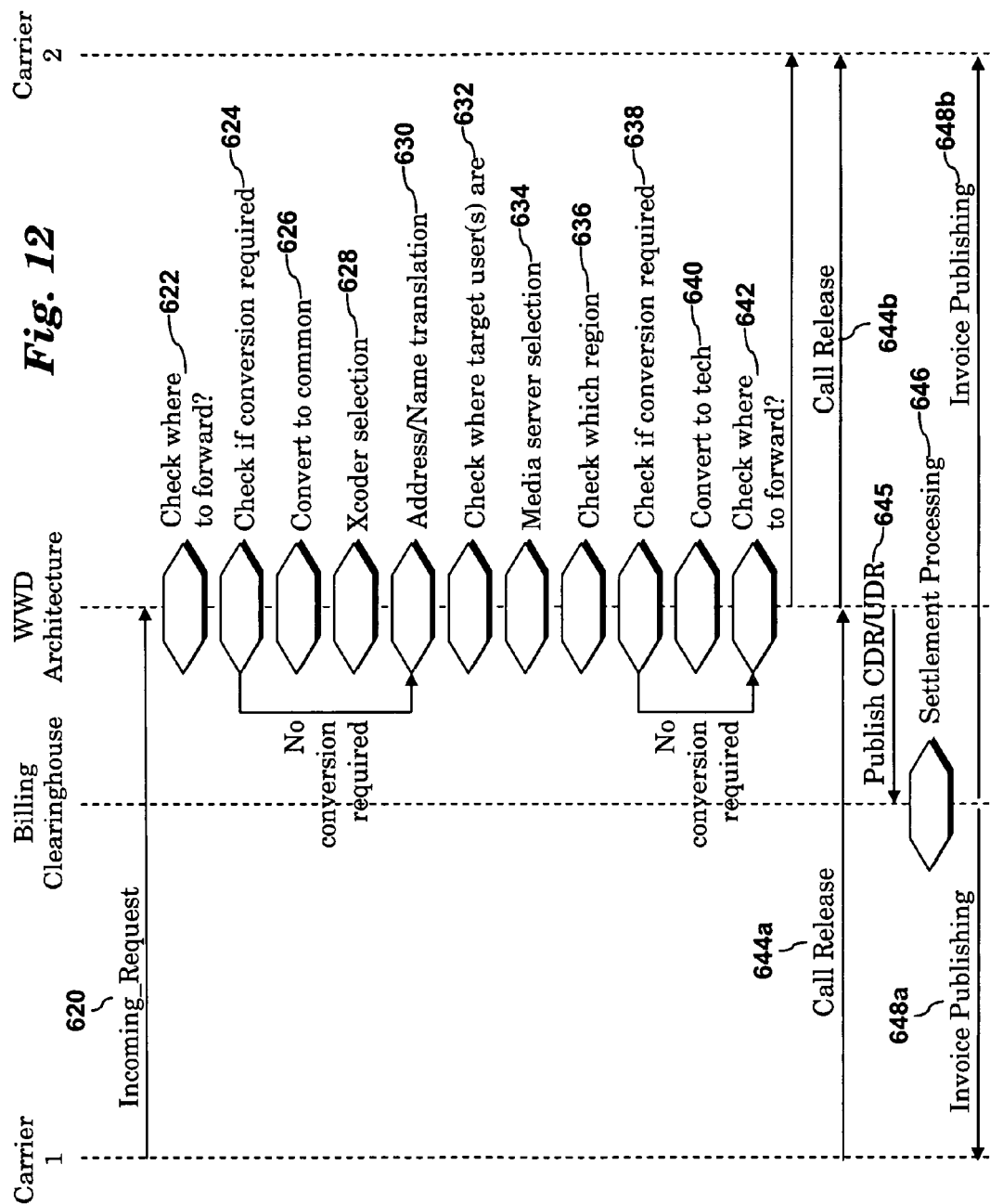

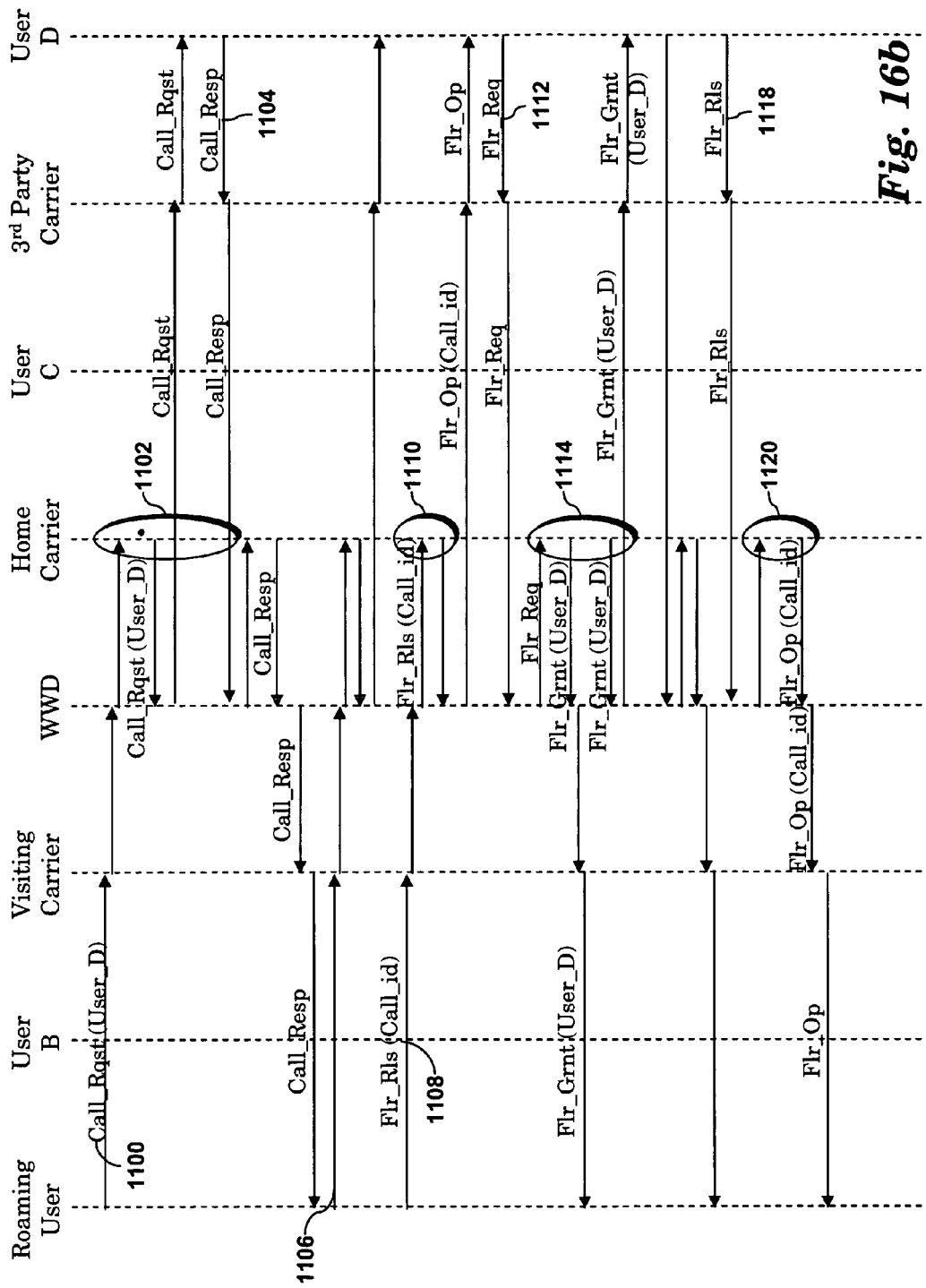

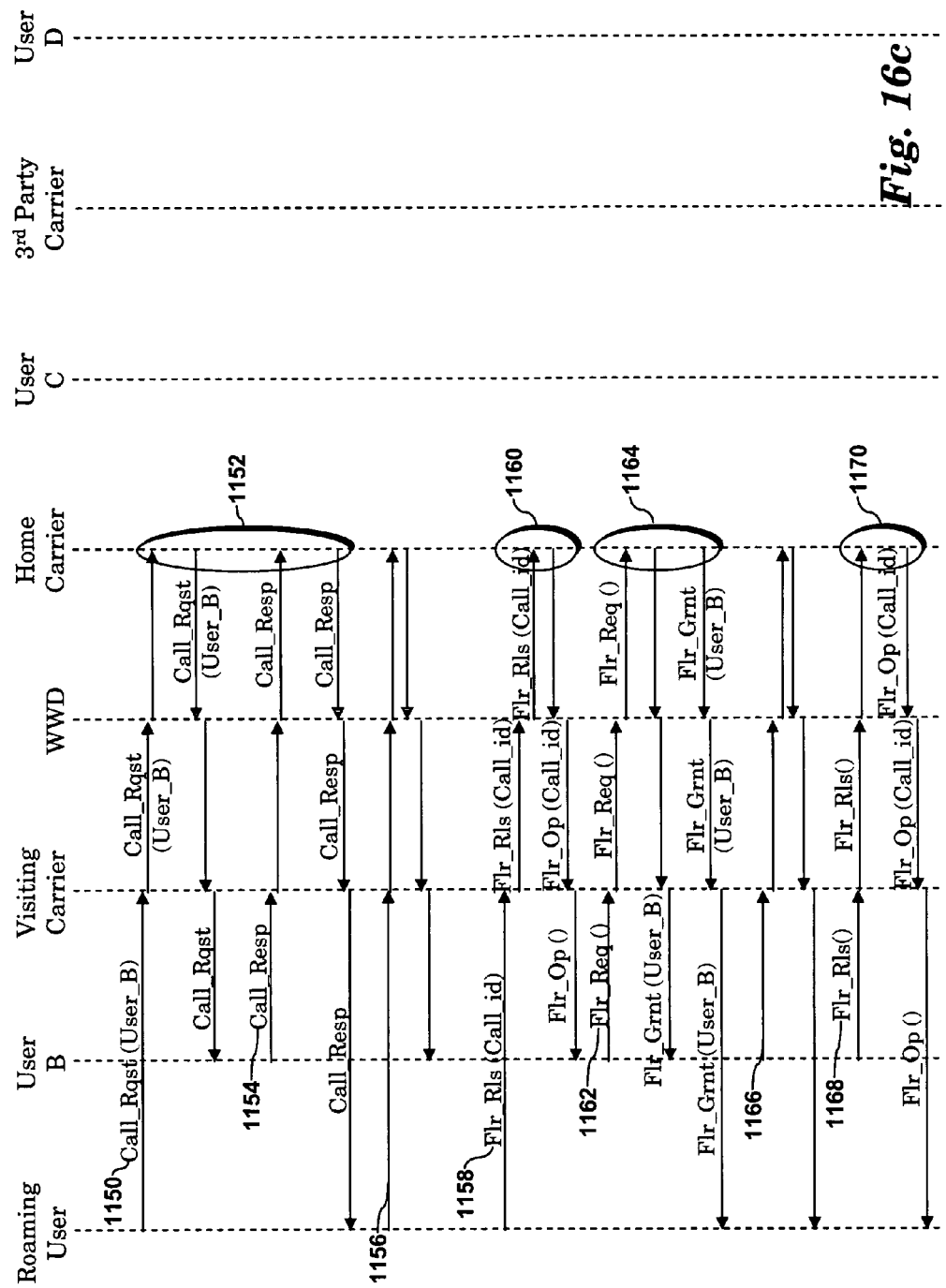

SYSTEM AND METHOD FOR FACILITATING ROAMING OF PUSH TO TALK SUBSCRIBERS ACROSS DISPARATE DISPATCH NETWORKS

CROSS REFERENCES TO RELATED APPLICATIONS

The present invention is a continuation-in-part of U.S. patent application Ser. Nos. 11/047,987 and 11/047,892, both of which were filed on Feb. 1, 2005, and claims priority to U.S. Provisional Patent Application Nos. 60/608,113, 60/608,131, 60/608,117, 60/608,126 and 60/608,110, all of which were filed on Sep. 9, 2004, the disclosures of which are incorporated herein by reference.

FIELD OF THE INVENTION

The present invention relates generally to push-to-talk (PTT) wireless communications systems and more particularly to systems and methods for facilitating roaming of PTT subscribers across disparate, inter-worked PTT networks.

BACKGROUND OF THE INVENTION

Wireless communications systems are operated worldwide by wireless carriers who charge fees to wireless subscribers for use of the carrier's services such as interconnect, short message service (SMS), packet data and push-to-talk. Each wireless communications system services subscribers within a geographic coverage area and operates using one or more wireless technologies such as code division multiple access (CDMA), global system for mobile communication (GSM), time division multiple access (TDMA) or Advanced Mobile Phone Service (AMPS).

PTT services (also known as a walkie-talkie or dispatch services) are currently offered by some wireless carriers, such as Nextel's Direct Connect® service, and new PTT services and technologies have been proposed. Generally, a PTT call provides near-instant, half-duplex communication between a PTT caller and a target group of PTT users. PTT calls are currently limited to calls between wireless users who use compatible PTT technologies and are subscribers on the same carrier network. For example, subscribers on a network operated by a first wireless carrier cannot engage in PTT calls with PTT subscribers on a network operated by a second wireless carrier.

Proprietary solutions have been proposed to connect two or more PTT networks, but such solutions typically require each PTT network to connect separately to each of the other PTT networks. Many proposed solutions also require extensive modification to, and administration by, each carrier network and are not practical for connecting a large number of wireless carriers and technologies on a worldwide basis. Accordingly, a need exists for an inter-working network architecture that is optimized for PTT communications among subscribers on different carrier networks, irrespective of subscriber and carrier location and underlying PTT technology. A further need exists for an architecture and method to generate revenue for the use of an inter-working architecture and to facilitate revenue sharing and billing between disparate PTT carriers.

SUMMARY OF THE INVENTION

The present invention is a system and method for facilitating the roaming of PTT subscriber across disparate, inter-worked PTT networks. In one embodiment, a network for inter-working a plurality of dispatch networks having incompatible technologies includes a core inter-working network, a plurality of points-of-presence (POPs) and a plurality of border gateways. The core inter-working network includes a centralized database storing call detail records and usage data reports relating to dispatch sessions implemented across the network, and a billing clearinghouse for receiving the call detail records and usage data reports and generating invoices for each of the dispatch networks. The plurality of POPs are connected to the core inter-working network, and the plurality of border gateways interface each of the dispatch networks to at least one of the plurality of points-of-presence. The points-of-presence facilitate roaming of PTT subscribers on the dispatch networks.

In another embodiment, an inter-working architecture facilitates dispatch communications between a plurality of dispatch devices, including at least one roaming device, spanning a plurality of dispatch networks, with each dispatch network having a separate administrative domain and operating on at least one of a plurality of technologies. The inter-working architecture includes a plurality of interfaces facilitating communications with each of the dispatch networks, a signaling bridge, a signaling controller, a media gateway and a group server. The signaling bridge converts session messages and signaling messages between the plurality of dispatch networks. The signaling controller is interfaced with the signaling bridge, the signaling controller manages a dispatch session between an originating dispatch network and at least one target dispatch network. The media gateway is interfaced with the signaling controller to convert real-time media between the originating dispatch network and the target dispatch network. The group server is interfaced with at least one group server in each of the plurality of dispatch networks, and operates to manage inter-working group calls. A billing clearinghouse collects call data for a group session between two or more dispatch networks, reconciles the collected data and create inter-working invoices for the group session. All communications with an inter-working roaming device are routed through the inter-working architecture.

In another embodiment, a method facilitates the monetization of inter-working a plurality of disparate dispatch networks, each dispatch network providing dispatch services to a plurality of subscriber units, including roaming subscribers from other dispatch networks. The method includes receiving a dispatch session request from a roaming subscriber unit on an originating dispatch network, the dispatch session request identifying a group of the subscriber units spanning a plurality of target dispatch networks and processing, in a point-of-presence, the dispatch session request, including allocating signaling and media resources. The dispatch session request is forwarded to a border gateway associated with each of the target dispatch networks and group session is facilitated between the originating dispatch network and the target dispatch networks. An invoice for each of the participating dispatch networks is generated including charges for facilitating the group session.

BRIEF DESCRIPTION OF THE DRAWINGS

FIG. 7 is a call flow illustrating an operation of the PTT inter-working architecture of the second embodiment;

FIG. 12 is a call flow illustrating an operation of the PTT inter-working architecture of the third embodiment;

FIGS. 16a-c are call flows illustrating embodiments of the inter-working roaming architecture of FIG. 16;

DETAILED DESCRIPTION OF EXEMPLARY EMBODIMENTS

Figure 1:
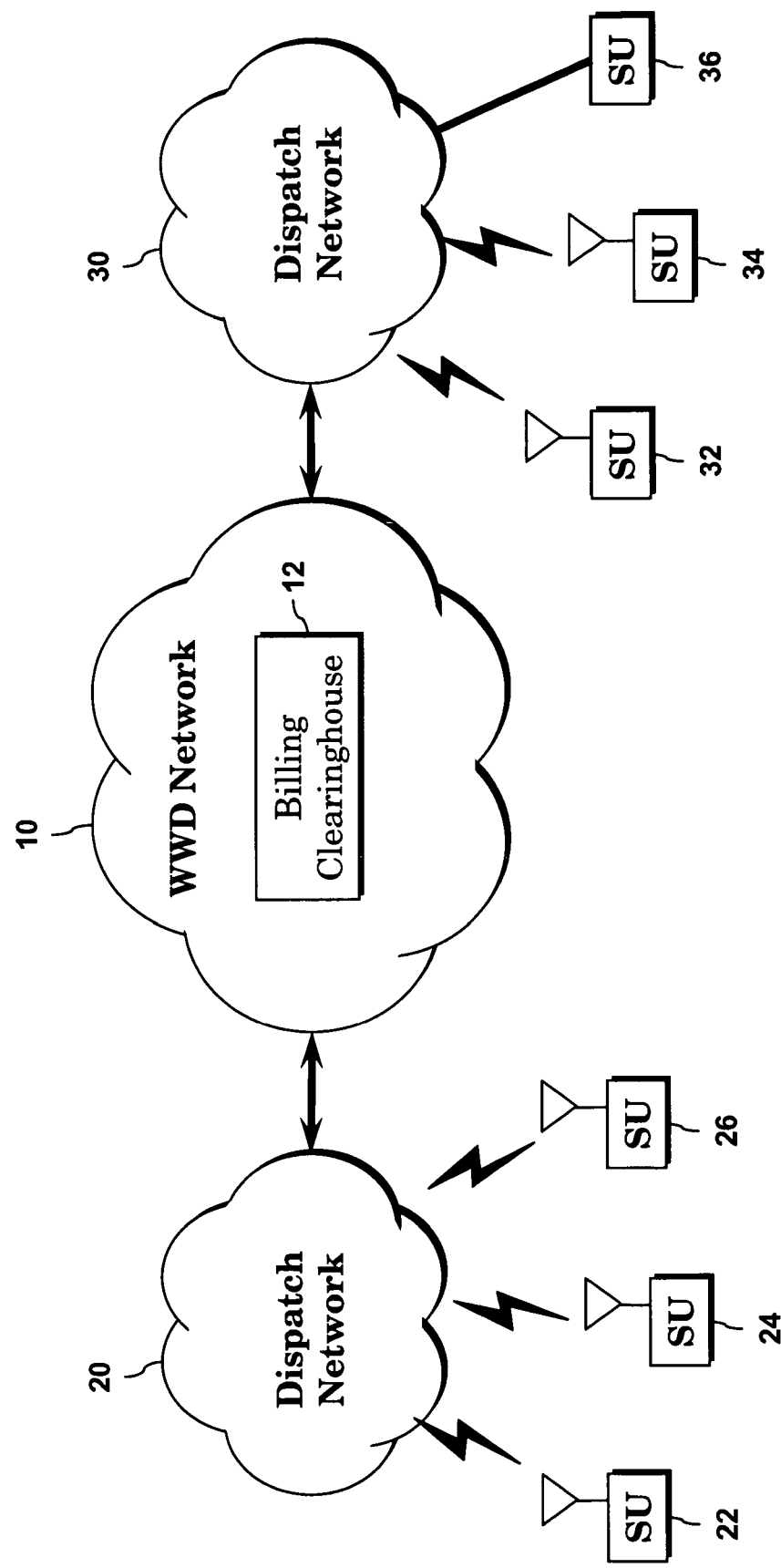
FIG. 1 is a block diagram illustrating a worldwide dispatch network in accordance with an embodiment of the present invention.

An embodiment of a worldwide dispatch architecture of the present invention will now be described with reference to FIG. 1. An inter-working architecture 10, referred to herein as a worldwide dispatch (WWD) architecture, provides a core infrastructure to which dispatch service providers may connect to enable inter-carrier and cross-technology dispatch sessions. The WWD network 10 assists in translating and managing dispatch sessions between a plurality of dispatch networks, such as dispatch network 20 and dispatch network 30, and includes a billing clearinghouse system 12 that stores call detail records (CDRs) and usage data reports (UDRs) to track, bill and provide settlement services relating to the usage of the WWD network 10.

The dispatch networks 20 and 30 may be any communications systems, including wireless and wireline networks, that facilitate dispatch communications between at least two devices. As illustrated, the dispatch network 20 is a communications network that facilitates dispatch calls between a plurality of subscriber units (SU), such as SUs 22, 24 and 26. The dispatch network 30 is a communications network that facilitates dispatch calls between a plurality of subscriber units, such as SUs 32, 34 and 36. The dispatch networks 20 and 30 may be operated by different carriers and may use different dispatch technologies and protocols.

The subscriber units may include any device that is adapted for dispatch communications with one or more of the dispatch networks. For example, the subscriber units may include wireless devices that are adapted to communicate with a dispatch network over a wireless communications link, including mobile telephones, personal digital assistants, and portable computers. The subscriber units may also include wireline devices, such as SU 36, coupled to a dispatch network through a physical connection, such as through the Internet. The dispatch networks may communicate using any of a number of dispatch protocols and technologies such as an Integrated Dispatch Enhanced Network (trademarked by Motorola, Inc. as iDen® and hereinafter referred to as "iDEN"), a network offering high performance push-to-talk (HPPTT) functionality, such as the functionality offered by Qualcomm, Inc. under the trademark QChat®, or a PTT over Cellular network (PoC). It will be appreciated that the illustrated embodiment is exemplary and that any number of networks, wireless and wireline devices may be inter-worked to operate with the WWD network 10.

In operation, a user may access any compatible dispatch network and initiate a dispatch call with any other user connected to the WWD network 10. For example, user 22 may initiate a dispatch call with user 32. The dispatch network 20 will recognize that user 32 is not a subscriber of the dispatch network 20 and will forward an initial dispatch request to the WWD network 10. The WWD network 10 determines the address and location of the user 32, allocates necessary resources for handling the dispatch call, and forwards the initial request to dispatch network 30. The dispatch network 30 processes the initial request and responds to the WWD network 10. The WWD network 10 manages the dispatch session between user 22 and user 32 and performs any necessary translation between the formats and protocols of dispatch network 20 and dispatch network 30.

Figure 2:
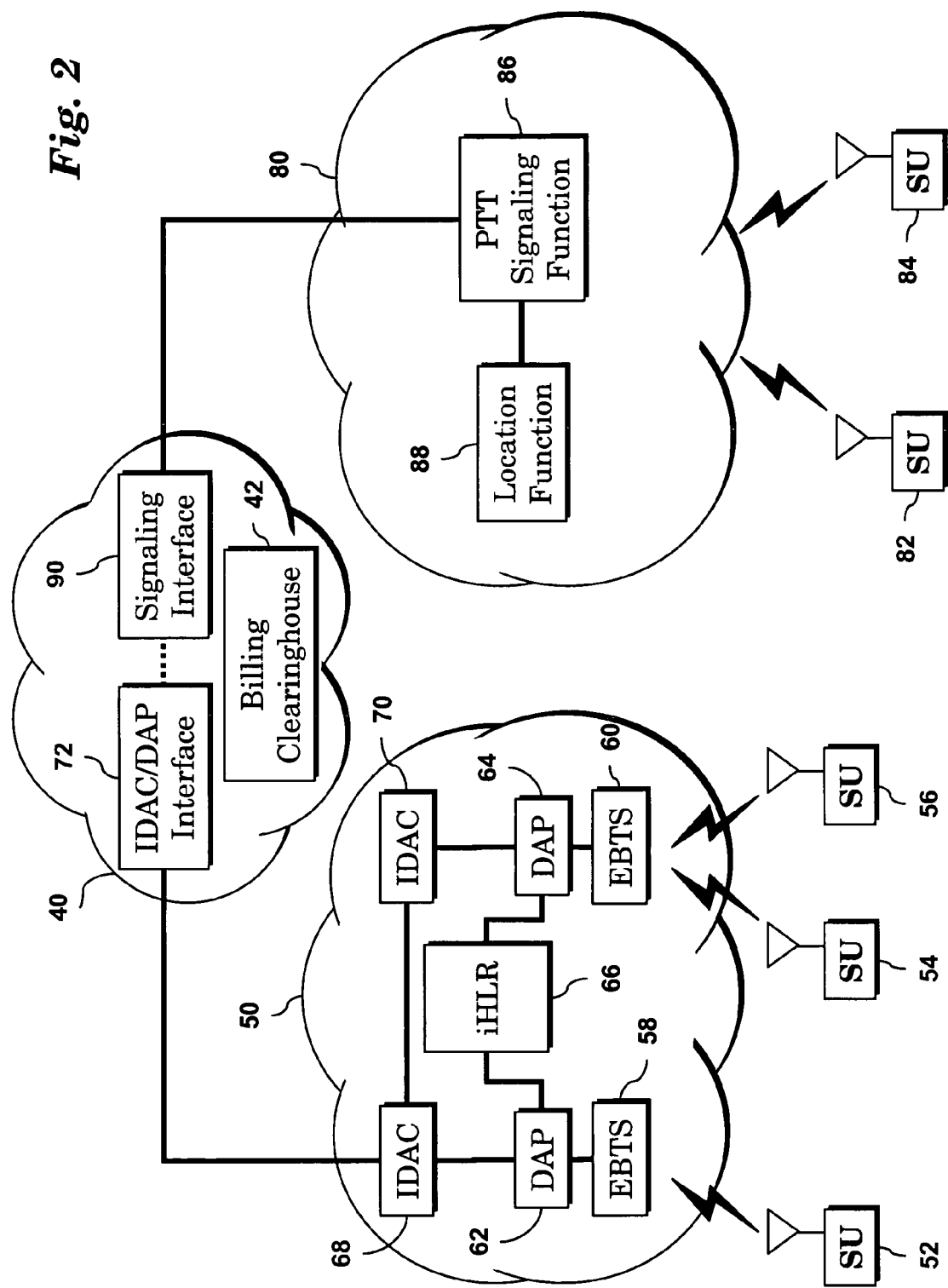
FIG. 2 illustrates functional interfaces between a worldwide dispatch network and PTT networks in accordance with an embodiment of the present invention.

An embodiment of the interface between a WWD network and dispatch networks is illustrated in FIG. 2. A WWD network 40 is connected to a plurality of PTT networks, including an iDEN network 50 and a generic PTT network 80. The WWD network 40 includes a billing clearinghouse 42 for the monetization of communications facilitated by the WVWD network 40. In an alternate embodiment, one or more PTT networks may be connected to the WWD network 40 via a GPRS Roaming exchange network or CDMA roaming exchange network.

Figure 3:
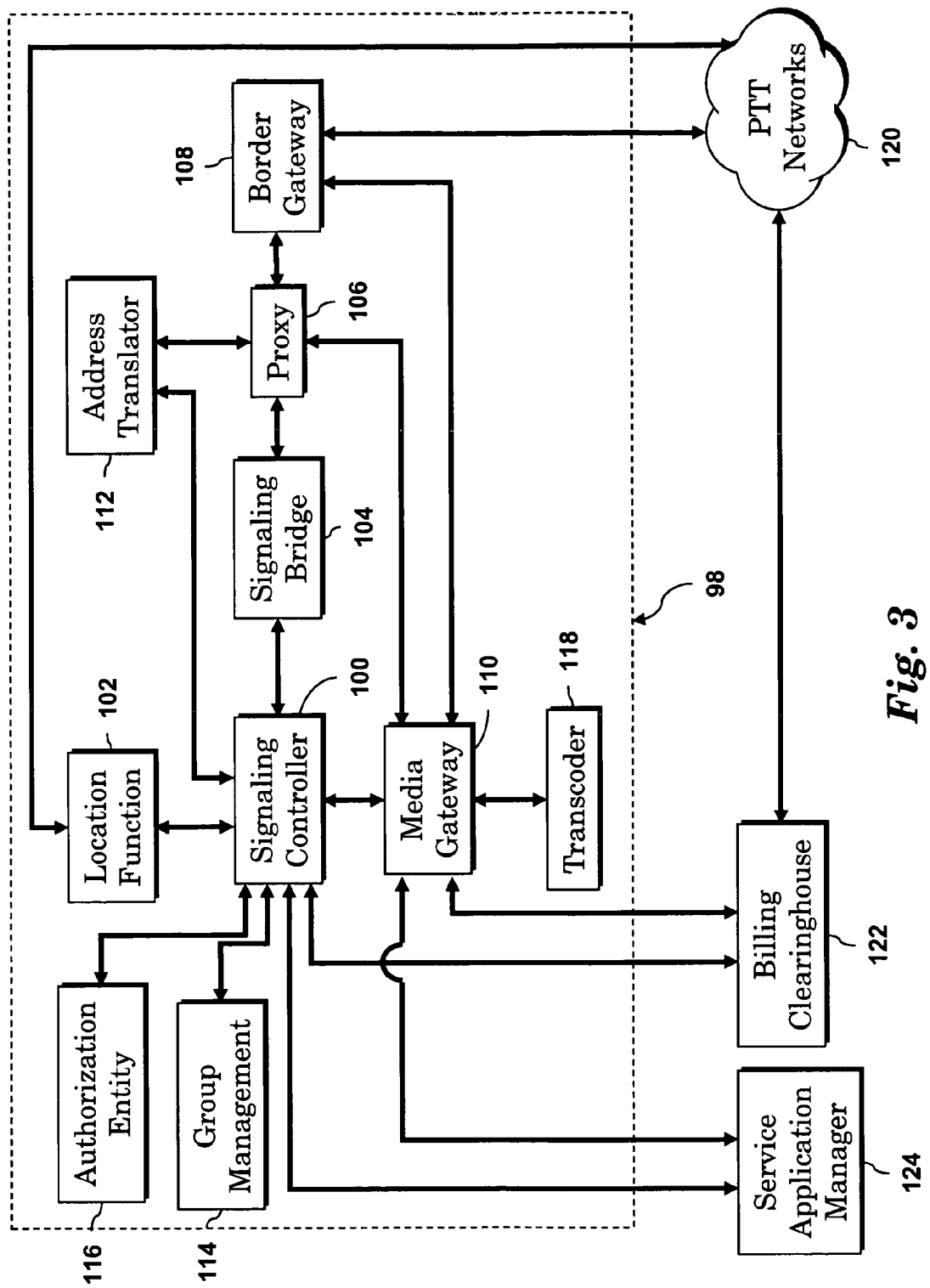
FIG. 3 is a block diagram illustrating functional elements of a worldwide dispatch architecture in accordance with an embodiment of the present invention.

The iDEN network 50 provides wireless PTT services to a plurality of subscriber units 52, 54 and 56. The iDEN network 50 includes a plurality of iDEN base stations known as enhanced base transceiver systems (EBTSs 58 and 60), a plurality of dispatch controllers known as iDEN dispatch application processors (DAPs 62 and 64) and an iDEN Home Location Register 66 (iHLR). The iDEN network 50 may also include a plurality of iDEN dispatch access controllers (iDACs 68 and 70) that facilitate PTT calls across iDEN urban areas. It will be appreciated that the iDEN network 60 illustrated in FIG. 3 is exemplary and that other network configurations can be utilized with the WWD network 40 of the present invention.

In operation, EBTS 58 provides wireless services to the subscriber unit 52, and EBTS 60 provides wireless services to the subscriber units 54 and 56. Subscriber unit 52 may initiate an ad hoc group PTT call with other subscribers on the iDEN network 60, such as subscriber units 54 and 56, by transmitting a PTT request to its local EBTS 60, which forwards the request to DAP 62. DAP 62 interfaces with the iHLR 66 to determine the location of the target subscriber units 54 and 56. DAP 62 (the controlling DAP) next communicates with DAP 64 (the remote DAP) to page the subscriber units 54 and 56, setup the PTT call, and manage the PTT call.

Subscriber unit 52 may also initiate a group PTT call with subscriber units 82 and 84 that are serviced by PTT network 80. In the exemplary embodiment, the location of subscriber units 82 and 84 are not known to the DAP 62 and iHLR 66, and the iDEN network 50 is configured to forward such foreign (or otherwise unknown) PTT targets to the WWD network 40. The iDEN network 50 is connected to the WWD network 40 through an iDAC/DAP interface 72. In this manner the WWD network 40 is seen by the iDEN network 50 as another DAP, i.e., a standard component of the iDEN network. DAP 62 (the controlling DAP) communicates with the iDAC/DAP interface 72 (the remote DAP) to page the mobile stations 82 and 84, setup the PTT call and manage the PTT call. Because the WWD network 40 is seen as a DAP by the iDEN network 50, no further modification of the iDEN network is necessary.

The PTT network 80 interfaces with the WVVWD network 50 in a similar manner. The PTT network 80 includes a PTT signaling function 86 that manages PTT sessions between a plurality of PTT network subscribers, such as subscriber units 82 and 84. In operation, the subscriber unit 82 may initiate a PTT call to another subscriber on the PTT network 80, such as subscriber unit 84. The PTT signaling function 86 receives the initial PTT request, works with the location function 88 to determine the location of the target subscriber unit 84, forwards the PTT request to the target subscriber unit 84, sets up and manages the PTT call.

The subscriber unit 82 may also initiate a PTT call to a target subscriber unit on a different PTT network, such as subscriber unit 52 on iDEN network 50. In accordance with an embodiment of the present invention, the PTT signaling function 86 is adapted to forward foreign target addresses, such as an address of a user not currently being serviced by the PTT network 80, to the WWD network 40. The WWD network 40 includes a PTT signaling controller interface 90 for interfacing with the PTT signaling function 86. In one embodiment, the signaling interface 90 is seen by the PTT signaling function 86 as a common network element of the PTT network 80, such as a remote signaling controller. The PTT signaling function 86 forwards the session request to the PTT signaling interface 90. The WWD network 50, through the iDAC/DAP interface 72 forwards the session request to the iDEN network 50 which processes the request in substantially the same manner as if it came from an internal iDEN DAP.

The WWD network 40 performs the necessary signaling translation between the originating and the terminating legs of a PTT session and ensures that appropriate media resources are allocated to service the PTT session. The WWD network 40 also translates in-session requests including the addition of a member to the PTT call and deletion of a member from a group call. In one embodiment, the WVVWD network 40 is adapted to translate across talker arbitration protocols implemented by various PTT technology vendors, including via the signaling plane using SIP method(s) and via the bearer plane using extensions to the RTCP protocol.

An embodiment of a WWD architecture will now be described with reference to the functional block diagram of FIG. 3. It should be noted that the functional components in FIG. 3 are not necessarily individual physical components or software modules, and that one or more components may be combined into a single physical component or software module or distributed across a plurality of physical devices and locations. Various physical architectures will be discussed in connection with FIGS. 4-13.

A WWD architecture 98 includes a signaling controller 100 that manages communications across PTT carriers and technologies. The signaling controller 100 is adapted to locate target users from the addresses received from the calling network. The PTT network on which the target user is located is determined via lookup by querying the address translator 112 and the location function 102. In one embodiment, the domain portion of the target user address is used to identify the target PTT network 120. After the PTT networks are identified, a determination is made as to whether transcoding is required between the calling PTT network and target PTT network through a transcoder 118. The signaling controller 100 may also host and manage sessions for roaming subscribers and locate users in a WWD roaming database. It is further contemplated that the signaling controller 100 may perform admission control to prevent unwanted access to the WWC architecture 98 and, with respect to authorized PTT access, enforce restrictions based on resource availability and contractual terms and conditions.

A location function entity 102 is connected to the signaling controller 100. The location function 102 assists in PTT registration of roaming subscribers across PTT networks 120 in the WWD network, tracks the locations of roaming users and notifies the signaling controller 100 of roaming user location for appropriate routing of incoming sessions. The location function 102 also interfaces with corresponding location functions of participating PTT networks to perform registration of roaming subscribers.

A signaling bridge 104 converts session and signaling messages from one PTT technology to another. In one embodiment, each PTT technology is translated into a format that is common across the WWD network based on a static mapping of the applicable network address to the corresponding PTT technology. In one embodiment, the common network protocol is based on SIP (session initiation protocol), with extensions added as necessary to facilitate the communications described herein. Alternatively, the translation may be based on an explicit protocol type embedded in the messages. The signaling bridge 104 is interfaced with the signaling controller 100, which uses the interface to exchange signaling messages with the signaling bridge 104 in a common format.

A proxy 106 analyzes incoming session requests to determine whether the originating and terminating PTT networks use the same PTT technology. If the same PTT technology is used then the proxy 106 facilitates communications between the originating and terminating PTT networks without translation. The proxy 106 is adapted to optimize the latency performance of sessions originating from and terminating to subscribers with the same PTT technology but belonging to different carrier networks. If different technologies are used, then the session is routed to the signaling bridge 104 for translation. In one embodiment, the proxy 106 makes routing decisions based on address translation data received from an address translator 112. Alternatively, the proxy 106 may make routing decisions based on PTT protocol type information embedded in the session header. In one embodiment, the proxy 106 is interfaced with the media gateway 110, and the proxy 106 routes sessions to the media gateway 110 when signaling translation is not required (due to the same signaling format being used between PTT networks), but media translation is required (due to different media formats being used between PTT networks).

A group management entity 114 is connected to the signaling controller 100 for managing inter-network group sessions on behalf of PTT carriers. The group management entity 114 provides group definitions to the signaling controller 100 and brokers and assists in the propagation definition of groups spanning across multiple PTT carriers. The group management entity 114 includes an interface to group management servers associated with one or more of the PTT networks 120. In one embodiment, the group management entity 114 also provides group definitions to a service application manager 124. The service application manager 124 interfaces with the WWD architecture 98 to provide static and dynamic data to PTT applications to process and deliver value added features to subscribers of the PTT networks.

The authorization entity 116 is connected to the signaling controller 100 and operates to manage call restrictions and authorization data for roaming subscribers and session requests to and from subscribers to applications from the service application manager 124.

In one embodiment, the WWD network 98 authorizes PTT sessions at the carrier level, and assumes that a subscriber initiating a PTT session has already been authenticated and authorized by the originating carrier. Access to applications available through the WWD network 98 are also authorized at the carrier level rather than at the subscriber level. In this manner, individual subscribers will not have to register with the WWD network 98 to enable cross-carrier PTT services.

The WWD network 98 is adapted to translate user addresses to identify the terminating network, perform appropriate translation and route the translated sessions to the proper target network. These translation functions are performed by the address translator 112. The address translator 112 provides translation services to the proxy 106 and the signaling controller 100 to map domains into IP addresses to properly route session messages. In the event different naming conventions are used across two or more PTT networks 120, the address translator 112 also provides translation of user addresses. In alternate embodiments, the user address translation may be performed at the signaling controller 100 or the signaling bridge 104. It is further contemplated that individual PTT networks 120 may perform user address translation within the PTT network.

The media gateway 110 is interfaced with the signaling controller 100 and is used to setup media paths, exchange media type and type of transcoding to be done by the media gateway 110. The MEGACO (media gateway control) protocol with enhancements may be used for this interface. The media gateway 110 is also interfaced with the PTT networks 120 to exchange and transport media packets between the WWD network 98 and the PTT network's media gateways.

In one embodiment, the media gateway 110 also performs jitter buffering to minimize the variable delays encountered inside and outside of the WWD administrative domain. The media gateway 110 also performs latency smoothing to avoid floor starvation during a group call spanning two or more carriers. In another embodiment, the media gateway 110 schedules session streams in accordance with service level agreements with associated PTT carriers to ensure appropriate treatment is accorded to the media per the agreements.

The transcoder 118 translates between voice formats to facilitate voice sessions across a plurality of carriers and technologies. The transcoder 118 is used when the end points of a session do not support a common codec. In one embodiment, the transcoder 118 is implemented as part of the media gateway 110.

In the exemplary embodiment, the border gateway 108 is connected to the media gateway 110 via an IP network. The signaling and media traffic between the WWD network 98 and the PTT networks 120 passes through the border gateway 108. The border gateway 108 hosts the necessary trust relationships and related security associations between the WWD network 98 and the PTT networks 120. In one embodiment, the border gateway 108 performs metering, marking, classifying and policing of the traffic traversing the border gateway 108 in both directions in accordance with aggregate carrier service level agreements, which may include multiple levels of quality of service including requirements specifying network availability, latency and packet loss rate and service availability and denial and billing accuracy.

Each PTT network 120 is connected to the WWD network 98 through the border gateway 108. In the exemplary embodiment, IPSEC (IP Security Protocol) association may be the basis of the interface between the border gateway 108 and the PTT networks 120. In one embodiment, a public IP address is assigned to each WWD service element that has an external interface accessible to the PTT networks 120 including: the border gateway 108, the proxy 106, the media gateway 110, the location server 102, the group management entity 114 and the address translator 112.

A billing clearinghouse 122 collects and aggregates UDRs and CDRs from the signaling controller 100 and media gateway 110. The billing clearinghouse 122 includes a settlement function that applies settlement logic to the collected data to perform reconciliation and create inter-carrier settlement invoices for the WWD sessions.

In the exemplary embodiment, each PTT network 120 is assumed to be a separate administrative domain that includes a call control function that manages PTT sessions within the PTT network, a media server, a talker arbitration function for managing floor control during a PTT session, and a group management function for administering group calls. The PTT network may also include other functional entities such as a registration/authentication function to ensure a caller is a valid subscriber, a compression function for efficient utilization of bandwidth, a service discovery function to locate network elements, and a location function for assisting in authentication and a roaming/authorization function.

Figure 4:
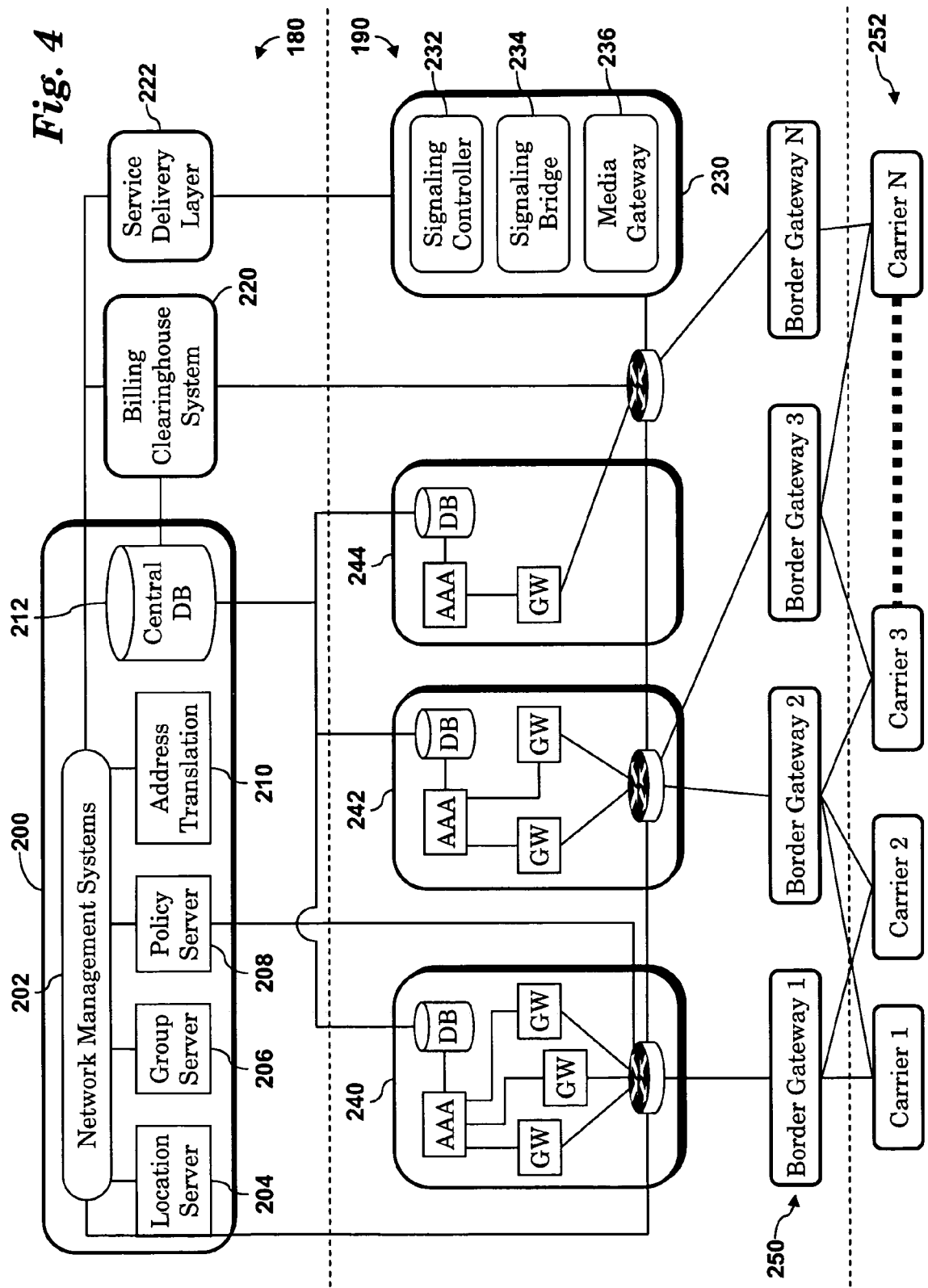
FIG. 4 illustrates a first embodiment of a PTT inter-working architecture.
Figure 5:
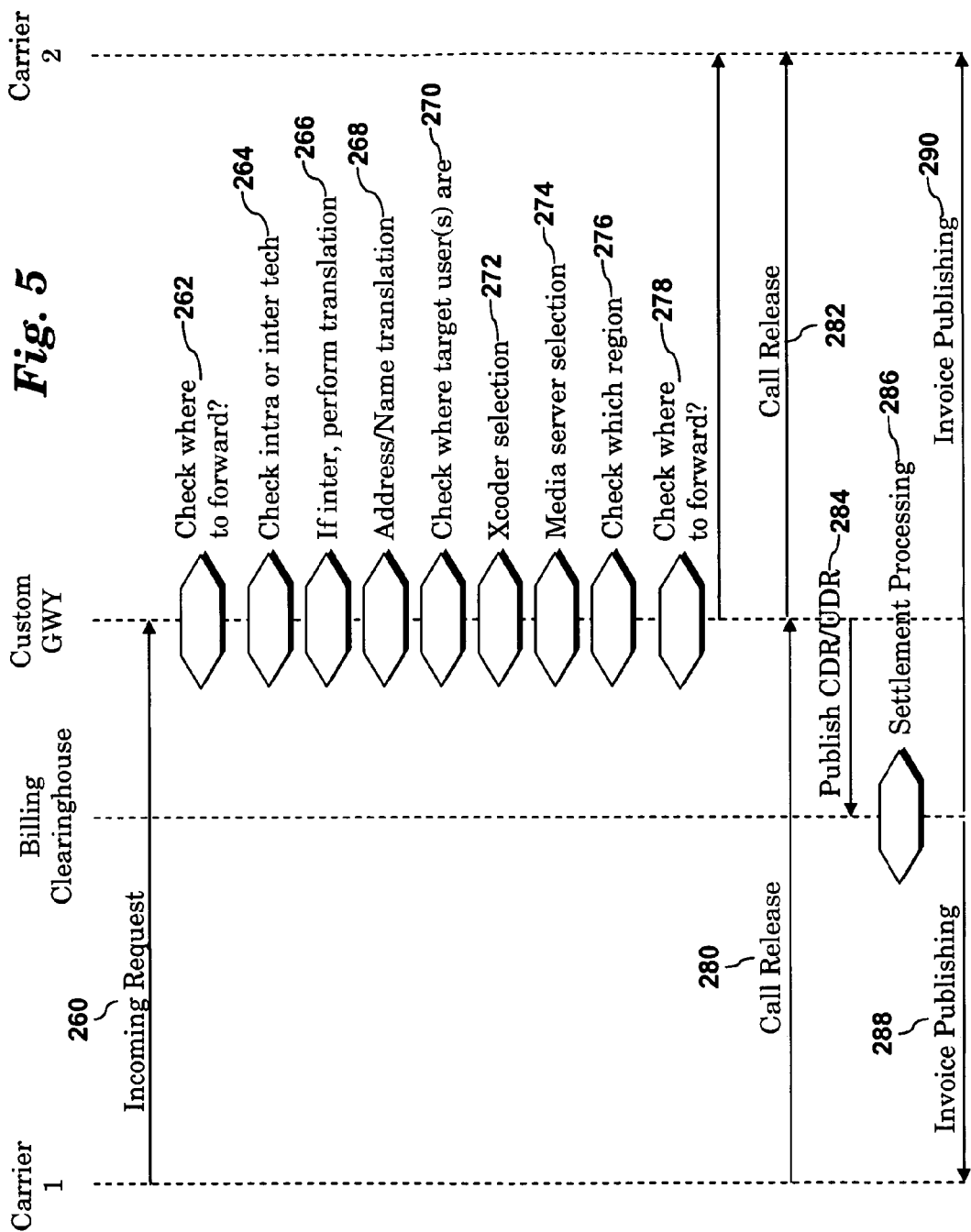
FIG. 5 is a call flow diagram illustrating an operation of the PTT inter-working architecture of the first embodiment.

Referring to FIG. 4, a first embodiment of a physical architecture to facilitate PTT interoperability across wireless carriers with disparate PTT technologies is illustrated. The architecture includes core network components 180 and regional network components 190. The core network components 180 include core inter-working components 200, a billing clearinghouse system 220 and a service delivery architecture 222. The core inter-working components 200 include network management systems 202, a location server 204, a group server 206, a policy server 208, an address translation server 210 and a centralized database 212.

The regional network 190 includes at least one point-of-presence (POP), such as POPs 240, 242 and 244. Each POP 240, 242 and 244 includes at least one custom PTT gateway (GW), an Authentication, Authorization and Accounting function (AAA) and a regional database (DB). The data in each regional database DB is replicated and synchronized with the central database 212. In one embodiment, each custom PTT gateway GW includes a proxy function, a signaling controller, a signaling bridge function for each supported technology and media gateways, as discussed above with respect to FIG. 3.

The carriers 252 may operate across a plurality of regions and connect to the inter-working architecture through a local border gateway 250. The connection between a local border gateway 250 and a carrier may be a leased line, fiber based layer 1 connection; ATM, LAN, Frame Relay based layer 2 connection; an IP VPN based layer 3 connection; or other connection as known to those skilled in the art. In one embodiment, each carrier network 252 also connects to at least one backup border gateway 250. The border gateways 250 route traffic from the carrier's network to a corresponding regional POP associated with the carrier's inter-working vendor.

Each custom gateway GW is adapted to create and forward CDRs to the billing clearinghouse 220, which stores the CDRs for subsequent processing by the settlement function. In one embodiment, to facilitate operation of PTT centric applications through the service delivery architecture 222, an inter-working vendor may include a service delivery interface 230 that includes signaling controller 232, signaling bridge 234 and media gateway 236.

In one embodiment, the carrier PTT networks 252 identify available inter-working gateways through standard discovery mechanisms, such as a DNS query. When participating in an inter-working session, the carrier PTT network is adapted to route the inter-carrier session to the appropriate custom gateway in the WWD network. The custom gateway is adapted to locate the target user(s), select media resources, perform technology translation and forward the session request to the respective carrier(s) of the target user(s).

In operation, a carrier network 252 is adapted to forward WWD requests to a regional POP associated with its WWD network interface. An embodiment of the operation of the architecture of FIG. 4 will now be described with reference to FIG. 5. An incoming WWD request 260 from Carrier 1 may be forwarded through a regional border gateway to a custom gateway in the WWD network. In one embodiment, the Carrier 1 locates an appropriate custom gateway via DNS discovery. The custom gateway may determine whether the session should be serviced by a different custom gateway, such as customer gateway in a different POP, and if appropriate, forwards the request to another custom gateway in step 262 to service the session. The custom gateway determines whether the originating and target technologies are the same (intra-technology call) or different (inter-technology call) in step 264. If the request is for an inter-technology call then the custom gateway translates the request to the target technology and performs necessary address and name translation in steps 266 and 268, respectively. The custom gateway next determines the location of the target users in step 270, selects appropriate vocoders in step 272, selects appropriate media servers in step 274 and determines the regional components serving the target carrier in step 276. The custom gateway next checks where to forward the request and then forwards the request to the appropriate target carrier network, Carrier 2, in step 278.

When the session is complete, the custom gateway releases allocated resources and terminates the PTT session. For example, if the originating caller hangs up, Carrier 1 transmits a call release message 280 to the custom gateway, which transmits a call release message 282 to Carrier 2. The custom gateway collects UDRs from the media gateway, and publishes CDRs and UDRs 284 collected during the session to the billing clearinghouse, which performs settlement processing 286 to allocate charges for the session. The billing clearinghouse subsequently publishes an invoice 288 to Carrier 1 and an invoice 290 to Carrier 2.

Figure 6:
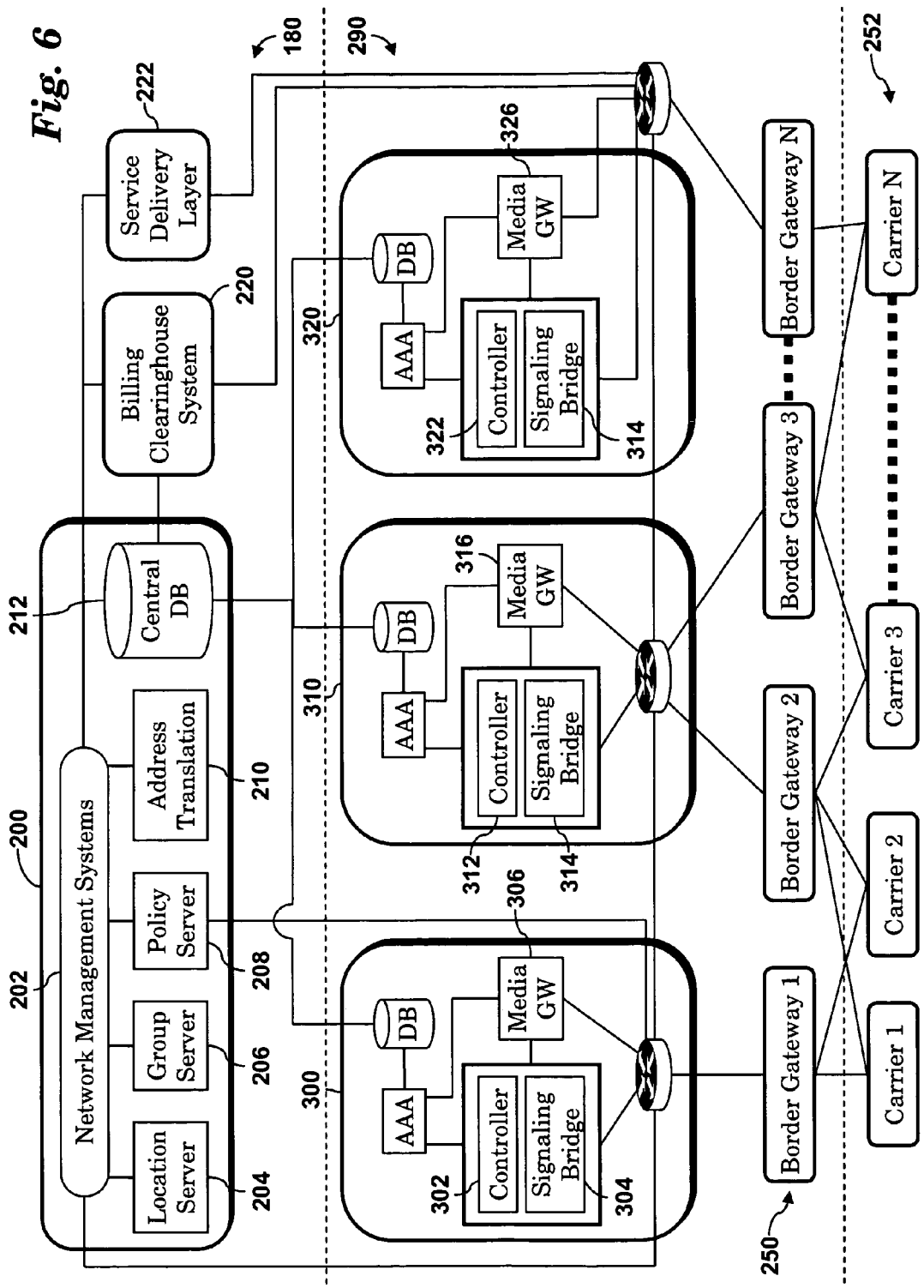
FIG. 6 illustrates a second embodiment of a PTT inter-working architecture.

A second embodiment of an architecture to facilitate PTT interoperability across wireless carriers with disparate PTT technologies is illustrated in FIG. 6. In this embodiment, the originating call is translated into a common signaling format within the WWD network before session processing, regardless of the originating and terminating technologies. After processing, the session is translated into the format of the terminating technology before being forwarded to the called party.

The second embodiment may include the same core network components 180, border gateways 250 and carrier networks 252 of the first embodiment illustrated in FIG. 4. The regional network components 290 include a plurality of POPs, such as POPs 300, 310 and 320. Each POP includes a signaling controller (302, 312, and 322, respectively), a signaling bridge (304, 314 and 324, respectively), and a media gateway (306, 316 and 326, respectively). Since every session is translated into a common format, custom gateways as used in the first embodiment are not required.

An embodiment of the operation of the architecture of FIG. 6 will now be described with reference to FIG. 7. In operation, the PTT networks 252, such as Carrier 1, route incoming WWD sessions to regional inter-working components that service the respective PTT networks. The regional inter-working components translate the incoming session request 350 into a common format used in the WVWD network 354. The regional inter-working components process the call and interact with the core inter-working components and other regional inter-working components to perform address translation 356, locate the target users 358, and set up vocoders 360 and media servers 362. Regional inter-working components associated with the terminating carrier, such as Carrier 2, are identified in step 364, the session is translated into the terminating technology format in step 366, and the translated request is forwarded to the terminating carrier in step 368. Because all sessions undergo translation, irrespective of the originating and terminating technologies, the proxy function is not required in this embodiment.

When the session is complete, the WWD architecture releases allocated resources and terminates the PTT session. For example, if the originating caller hangs up, Carrier 1 transmits a call release message 370 to the WWD architecture, which transmits a call release message 372 to Carrier 2. The WWD architecture publishes CDRs and UDRs 374 collected during the session to the billing clearinghouse, which performs settlement processing 376 to allocate charges for the session. The billing clearinghouse subsequently publishes an invoice 376 to Carrier 1 and an invoice 378 to Carrier 2.

Figure 8A:
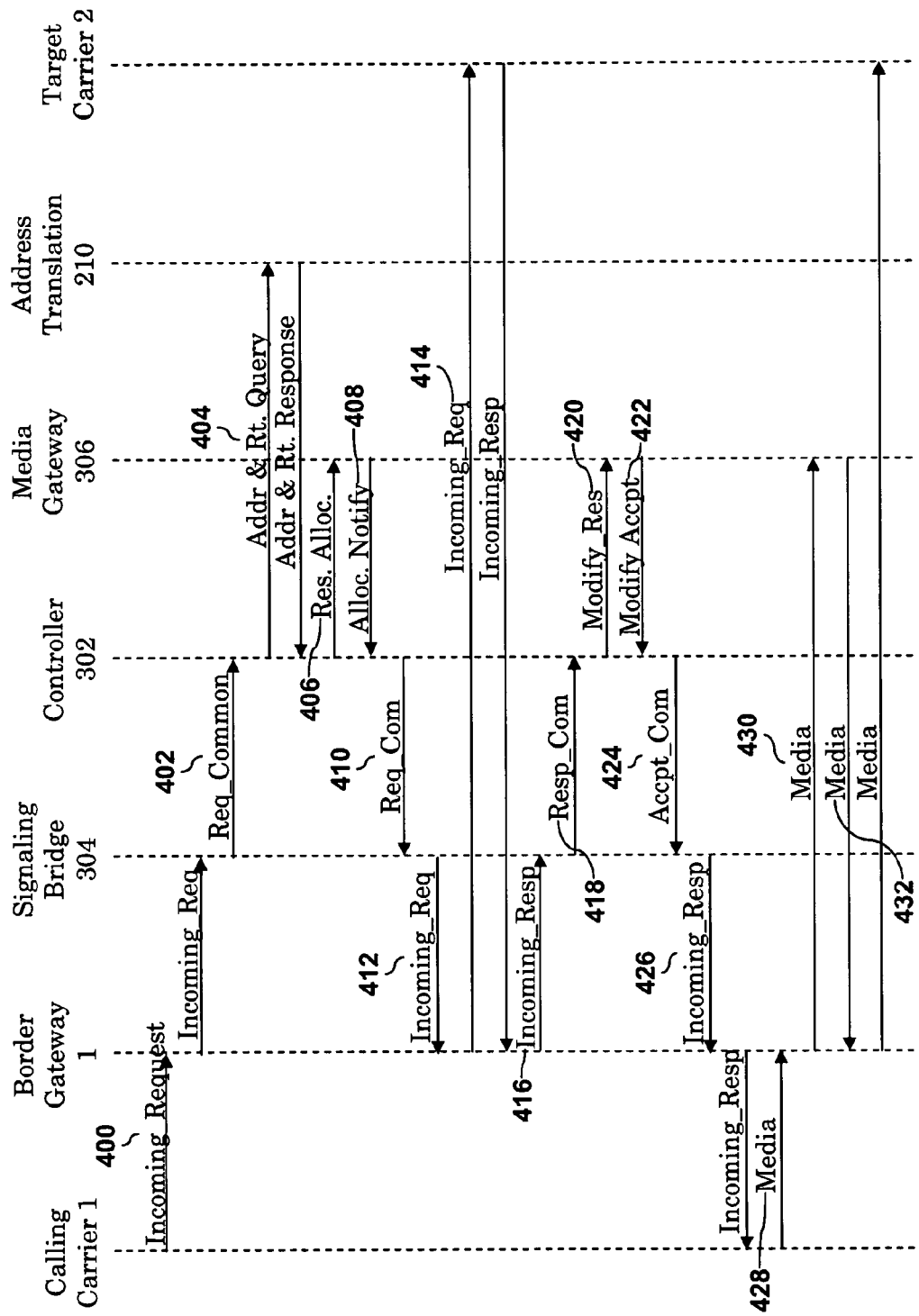
FIGS. 8a and 8b are call flow diagrams illustrating operations of the PTT inter-working architecture in accordance with the second embodiment.

The operation of the inter-working architecture of FIG. 6 will now be described in further detail with reference to the call flows illustrated in FIGS. 8a, 8b, 9a & 9b. FIG. 8a illustrates a call flow for a session traversing a single signaling bridge, controller and media gateway. The originating carrier network 1 initiates an inter-carrier PTT call to a target wireless carrier 2 by transmitting an incoming request 400 to border gateway 1, which forwards the request to signaling bridge 304 of the POP 300. The signaling bridge 304 translates the request to a common WWD format and forwards the translated request 402 to the controller 302. The controller 302 transmits a corresponding address and routing query 404 to the address translation server 210, which provides address and routing information in response. The controller 302 next communicates with a media gateway 306 to allocate the necessary resources to handle the PTT session (messages 406 and 408).

The incoming request is next forwarded to the target mobile carrier 2 in steps 410 through 414. First, the controller 302 transmits the request 410 to the signaling bridge 304, which translates the message from the common WWD format to a format compatible with the target mobile carrier 2, and transmits the incoming request 412 to the border gateway 1. The border gateway 1 transmits the incoming request 414 to the target mobile carrier 2, which responds to the request. The border gateway 1 forwards the incoming response 416 to the signaling bridge 304, which forwards the message in the common WWD format 418 to the controller 302. The controller 302 next communicates with a media gateway 306 to modify the allocated media resources as necessary to handle the PTT session (messages 420 and 422). The controller 302 forwards the accept message 424 to the signaling bridge 304 which translates the message into the format of the originating Carrier 1 and forwards the translated message 426 to the border gateway 1, which forwards the message to the originating Carrier 1.

After the PTT session is setup, the caller may speak into the dispatch device for transmission to the target user. Media packets 428 are transmitted from the calling Carrier 1 to the border gateway 1 which forwards the received media packets 430 to the media gateway 306. The media gateway 306 translates the media packets 430 into the format of target carrier 2 and returns the translated media packets 432 to the border gateway 1, which forwards the media packets to the target carrier 2, and subsequently, to the target dispatch device.

Figure 8B:
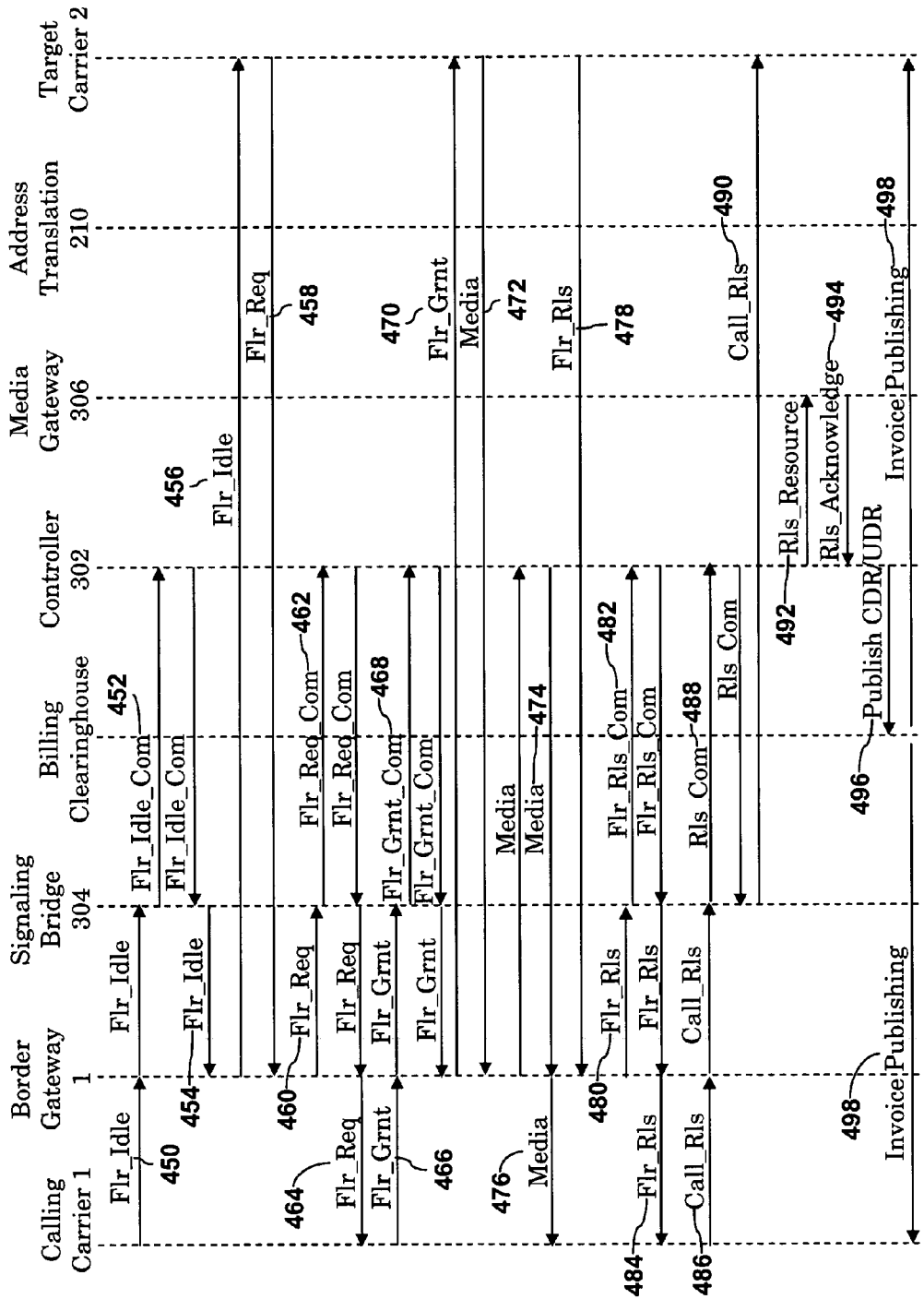

FIG. 8b illustrates a call flow for the session of FIG. 8a in which the target user transmits a voice response to the originating user. After the caller releases the PTT-button on the dispatch device, the calling carrier 1 transmits a flr_idle message 450 to indicate that the caller is relinquishing the floor. The flr_idle message 450 is transmitted to the signaling bridge 304 through border gateway 1. The signaling bridge 304 converts the flr_idle message into a common WWD format 452 used by the POP 300, and forwards the message to the controller 302. The controller 302 forwards the message to signaling bridge 304 for forwarding to the target carrier 2. The signaling bridge 304 translates the flr_idle message from the common format to the format of the target carrier 2, and forwards the translated flr_idle message 454 to the border gateway 1, which forwards the message 456 to the target carrier 2.

The user of the target device may then press the PTT-button on the target device to claim control of the floor and begin speaking. The target carrier 2 transmits a floor request, flr_req 458, to the border gateway 1, which forwards the message 460 to the signaling bridge 304. The signaling bridge 304 translates the message into a common WWD format 462 and forwards the request to the controller 302 which determines that the floor request should be sent to the calling Carrier 1 which is managing the PTT session. The signaling bridge 304 translates the flr_req message into the format of the calling Carrier 1 and forwards the message 464 to the calling Carrier 1 through the border gateway 1.

If calling Carrier 1 grants the floor to the target user, it sends a flr_grnt message 466 to the signaling bridge 304 through the border gateway 1. The signaling bridge 304 translates the flr_grnt message into the common format 468 and the controller 302 determines that the message should be forwarded to the target carrier 2. The signaling bridge 304 converts the message into the format of the target carrier 2 and transmits the flr_grnt message to the target carrier 2 through the border gateway 1. Media packets 472 carrying the target user's speech is received from the target carrier 2 and forwarded to the border gateway 1, which forwards the media to the media gateway 306 for translation into the calling carrier's format. The translated media packets 474 are then forwarded to the calling carrier 1.

When the target user releases the PTT-button, a floor release message, flr_rls 478, is transmitted from the target carrier 2 to the border gateway 1. The flr_rls message 480 is translated into a common format 482 by the controller 302, and then into the calling carrier's format 484 by the signaling bridge 304. Finally, the flr_rls message is transmitted to the calling carrier 1.

When the caller terminates the call, e.g., by hanging up, the calling carrier 1 transmits a call_rls message 486 to the border gateway 1. The message is translated by the signaling bridge 304, forwarded in message 488 to controller 302, and forwarded 490 to target carrier 3 through the signaling bridge 304. When the session is complete, the WWD architecture releases allocated resources and terminates the PTT session. The controller 302 transmits a release resource message 492 to media gateway 306 which returns a release acknowledge message 494. The media gateway 306 forwards UDRs collected during the session to the controller 302. In one embodiment, the UDRs are appended to the release acknowledge message 494. The controller 302 publishes CDRs and UDRs 496 collected during the session to the billing clearinghouse, which performs settlement processing to allocate charges for the session. The billing clearinghouse subsequently publishes invoices 498 to Carriers 1 and 2. In another embodiment, the media servers may publish the UDRs directly to the billing clearinghouse.

Figure 9A:
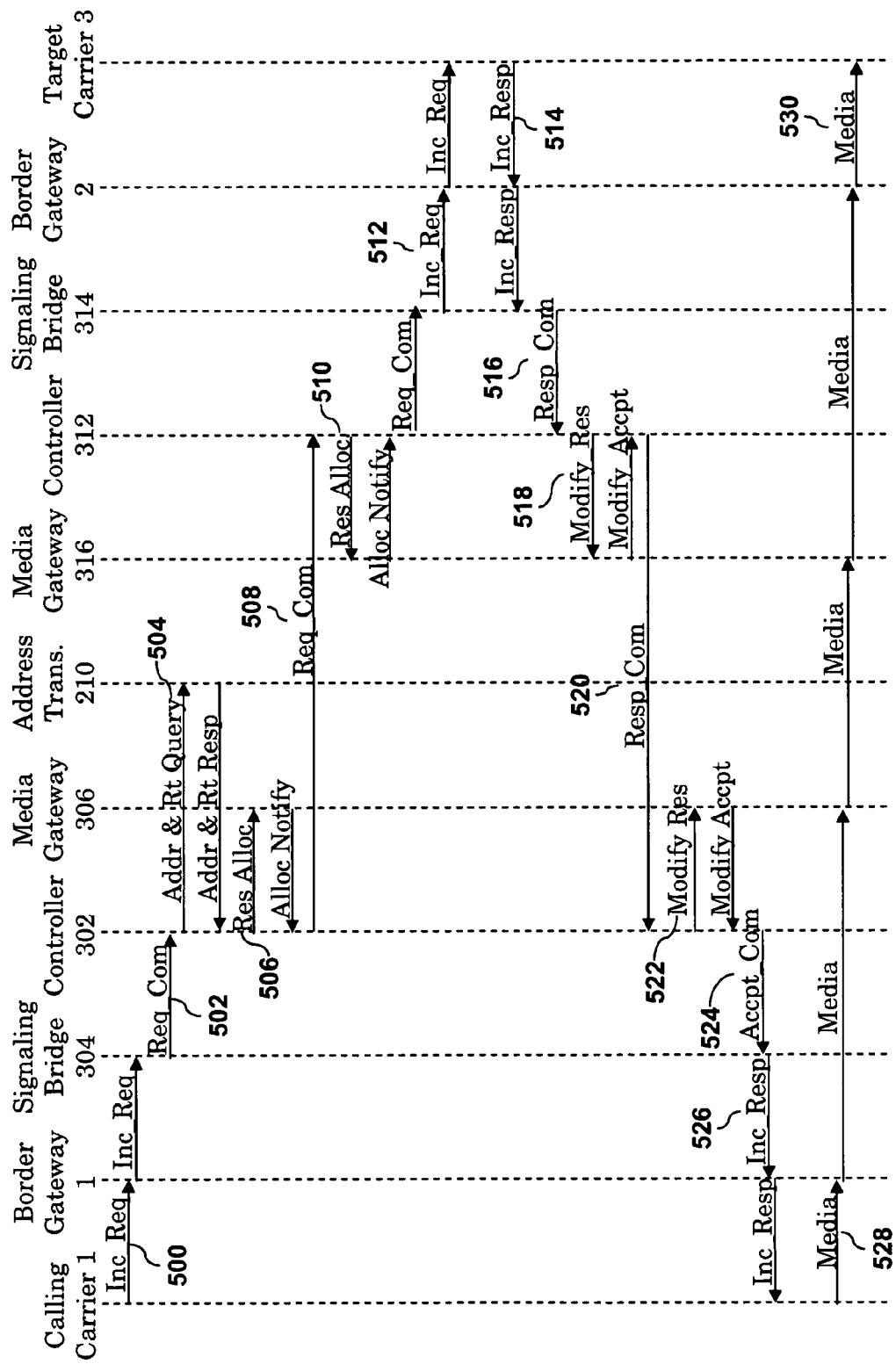
FIGS. 9a, 9b and 9c are additional call flow diagrams illustrating operations of the PTT inter-working architecture in accordance with the second embodiment.

FIG. 9a illustrates a call flow for another embodiment with the session originating and terminating in different signaling and media elements. The originating and terminating elements may be located in the same POP, or in different POPs, such as POPs 300 and 310, respectively. The calling carrier 1 initiates an inter-carrier PTT call to a target carrier 3 by transmitting an incoming request 500 to border gateway 1, which forwards the request to signaling bridge 304. The signaling bridge 304 translates the request to a common inter-working format and forwards request 502 to the controller 302. The controller 302 transmits a corresponding address and routing query 504 to the address translation server 210, which provides address and route information in response. The controller 302 next communicates 506 with the media gateway 306 to allocate necessary resources for the PTT call.

The controller 302, based on the received routing information, transmits the request 508 to controller 312. The controller 312 communicates 510 with the local media gateway 316 to allocate the resources necessary to translate media from the target carrier 3 to the common inter-carrier format. Next, the request is translated to the target carrier 3 format by the signaling bridge 314 and forwarded 512 to the target carrier 3.

The border gateway 2 receives an incoming response from the target carrier 3 and forwards the incoming response 514 to the signaling bridge 314, which forwards the response message in a common format 516 to the controller 312. After receiving the response, the controller 302 sets up media resources within the media gateway 306 by exchanging messages 518. The controller 302 next forwards the response 520 to the controller 302. The response is forwarded 522 to the media gateway 306 which returns an accept message to the controller 302. The response is then forwarded to the calling carrier 1 through the signaling bridge 304, which provides translation, and the border gateway 1.

After the PTT session is setup, the caller may speak into the dispatch device for transmission to the target user. Media packets 528 are transmitted from the calling carrier 1 to the border gateway 1 which forwards the received media packets to the media gateway 306. The media gateway 306 translates the media packets 430 into a common inter-working format and forwards the translated media packets to media gateway 316. Media gateway 316 converts the media packets from the common format to the format of target carrier 3 and transmits the media packets 530 to the target carrier 3 through the border gateway 2.

Figure 9B:
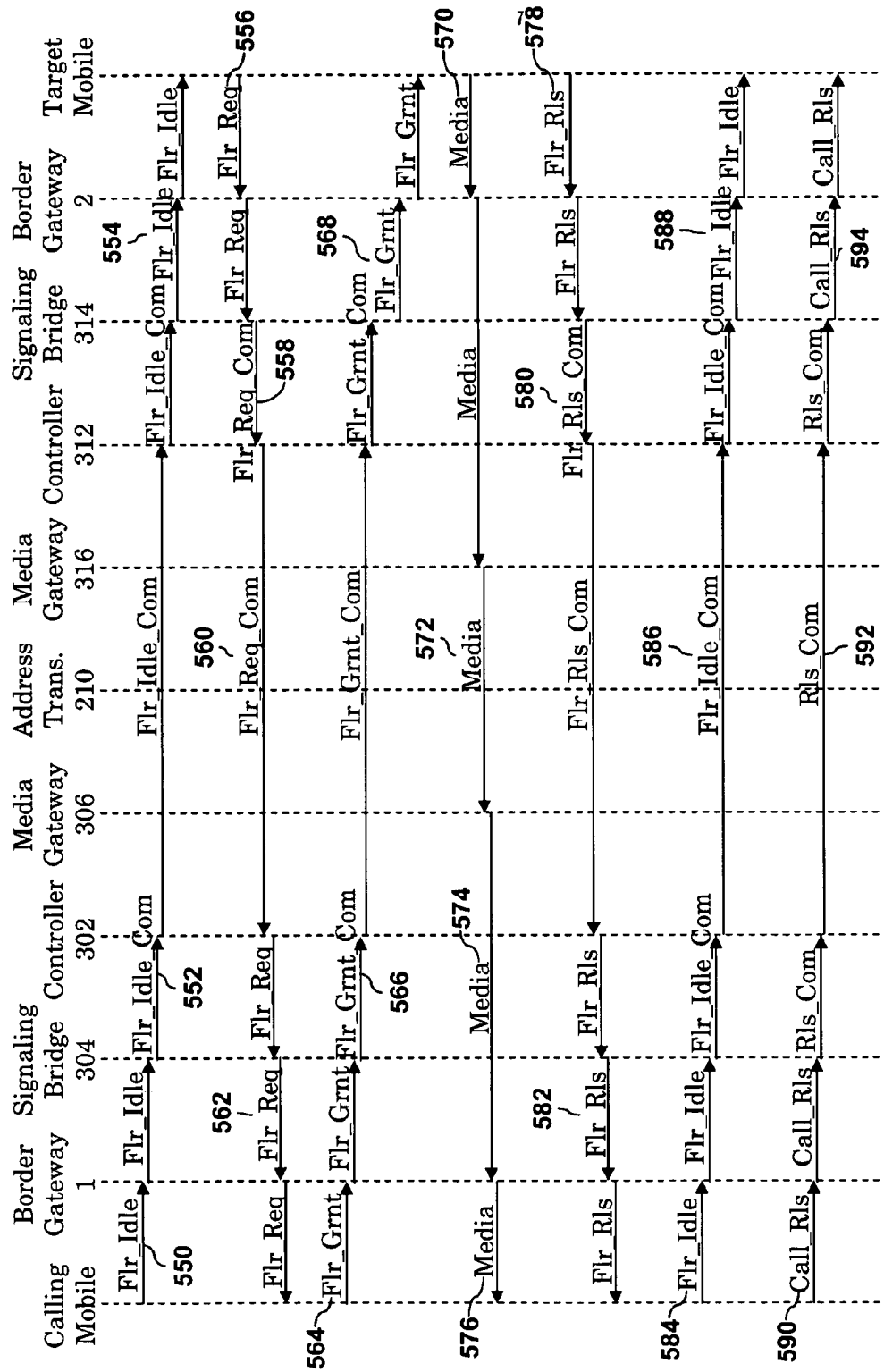

FIG. 9b illustrates a further call flow for the session of FIG. 9a in which the target user responds to the calling dispatch device. When the caller releases the PTT-button on the calling dispatch device, the calling carrier 1 transmits a flr_idle message 550 to indicate that the caller is relinquishing the floor. The flr_idle message 550 is transmitted to the signaling bridge 304 through border gateway 1. The signaling bridge 304 converts the flr_idle message into a common format 552 used by the inter-working architecture, and forwards the message to the controller 302. The controller 302 forwards the message to controller 312 which forwards the flr_idle_com message to signaling bridge 314. The signaling bridge 314 translates the flr_idle_com message from the common format to the format of the target carrier 3, and forwards the translated flr_idle message 554 to the border gateway 2, which forwards the message to the target carrier 3.

The user of the target user may then press the PTT-button on the target user to claim control of the floor and begin speaking. The target carrier 3 transmits a floor request, flr_req 556, to the border gateway 2, which forwards the message to the signaling bridge 314. The signaling bridge 314 translates the message into a common format 558 and forwards the request to the controller 312. Controller 312 determines that the floor request should be sent to the calling carrier 1 which is managing the PTT session and forwards the floor request to the controller 302. The message is then transmitted to the signaling bridge 304 which translates the flr_req message into the format of the calling carrier 1 and forwards the message 562 to the calling carrier 1 through the border gateway 1.

If calling carrier 1 grants the floor to the target user, then it returns a flr_grnt message 564 to the signaling bridge 304 through the border gateway 1. The signaling bridge translates the flr_grnt message into the common format 566 and the controller 302 determines that the message should be forwarded to the target carrier 2. The message is transmitted to the controller 312, translated by the signaling bridge 314 into the format of the target carrier 2 and forwarded to the target carrier 3 through the border gateway 2. Media packets 570 carrying the target user's audio data are received from the target carrier 3 and forwarded to the border gateway 2, which forwards the media to the media gateway 316 for translation into the common inter-working format and then to the media gateway 306 for translation into the format of the calling carrier 1. The translated media packets 576 are then forwarded to the calling carrier 1.

When the target user releases the PTT-button, a floor release message, flr_rls 578, is transmitted from the target carrier 3 to the border gateway 2. The flr_rls message 578 is translated into a common format 580 by the signaling bridge 314 and forwarded to the controller 312. The flr_idle_com message is then forwarded to the controller 302, translated by the signaling bridge 304 into the calling carrier's format 582 and forwarded to the calling carrier 1 through the border gateway 1. As illustrated, the calling carrier 1 then transmits another flr_idle message to the target carrier 2.

When the caller terminates the call, e.g., by hanging up, the calling carrier 1 transmits a call_rls message 590 to the border gateway 1. The message is translated by the signaling bridge 304, transferred between the controllers 302 and 316, translated into the target carrier's technology 594 and forwarded to the target carrier 3.

Figure 9C:
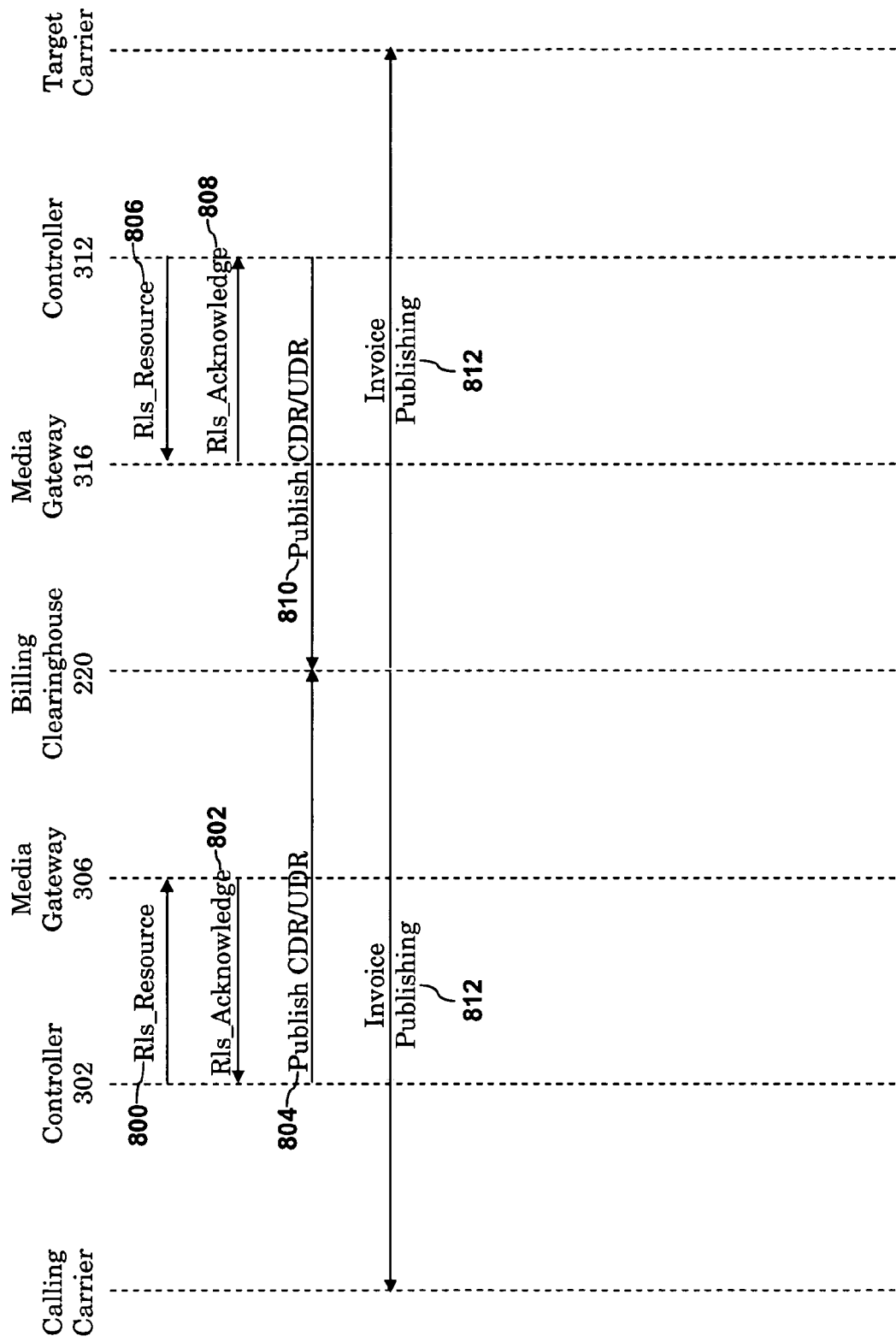

Upon receiving the call_rls message, the elements of the inter-working architecture release allocated resources and terminate the PTT session. Referring to FIG. 9c, the controller 302 transmits a release resource message 800 to media gateway 306 which returns a release acknowledge message 802. The media gateway 306 forwards UDRs collected during the session to the billing clearinghouse 220. In one embodiment, the UDRs are appended to the release acknowledge message 802. The controller 302 publishes the CDRs and UDRs 804 collected during the session to the billing clearinghouse 220, which performs settlement processing to allocate charges for the session. Similarly, controller 312 transmits a release resource message 806 to media gateway 816 which returns a release acknowledge message 808 including UDRs collected during the session. The controller 312 publishes the CDRs and UDRs 810 collected during the session to the billing clearinghouse 220. The billing clearinghouse 220 performs a settlement function to allocate charges for the session and subsequently publishes an invoice 812 to the calling carrier and an invoice 814 to the target carrier.

It will be appreciated that other session configurations and call flow routing may be implemented within the spirit and scope of the present invention. For example, it is contemplated that a PTT session may be implemented in which the PTT signaling is handled via a two signaling controllers but the media bearer paths are setup through a single media gateway.

Figure 10:
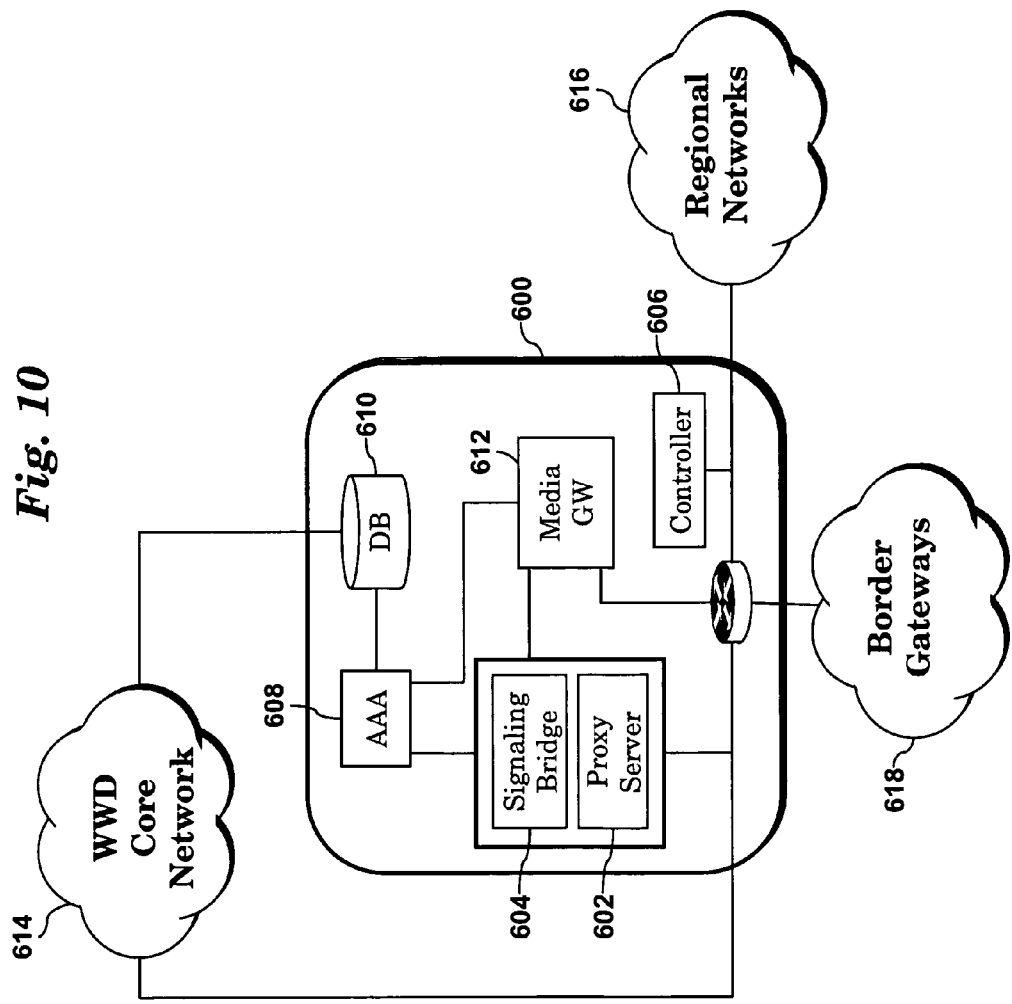
FIG. 10 illustrates a third embodiment of a PTT inter-working architecture.

A third embodiment of an inter-working architecture is illustrated in FIG. 10. This embodiment is similar to the second embodiment illustrated in FIG. 6, but includes a proxy 602 to control whether WWD sessions between carriers will be translated. As illustrated, at least one POP 600 is networked with the WWD core network 614, regional networks 616 and at least one border gateway 618. The POP 600 includes the proxy server 602, a signaling bridge 604, a controller 606, an AAA 608, a regional database 610 and a media gateway 612. By routing session through the proxy 602, sessions between carriers with the same PTT technologies will be implemented without translation into a common protocol. This reduces the call setup and floor arbitration latencies associated with the inter-working calls of the second embodiment.

Figure 11:
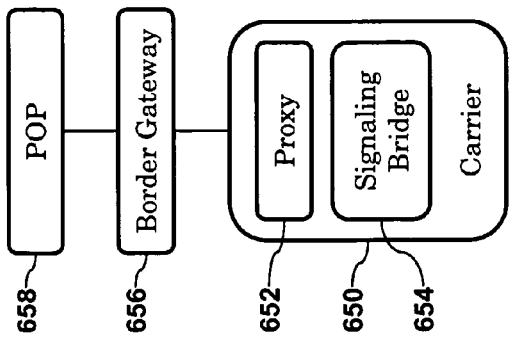
FIG. 11 illustrates a fourth embodiment of a PTT inter-working architecture.

Referring to FIG. 11, in a fourth embodiment at least one carrier network 650 includes a proxy server 652 and a signaling bridge 654. The carrier network 650 is connected to the WWD network through a border gateway 656 and a POP 658. The proxy and signaling bridge functions are included in the POP 658 (or other POPs) to serve carriers who have not deployed the signaling bridge functionality as part of their PTT infrastructure deployment. In this embodiment, the signaling traffic received from the carrier 650 by the WWD network is already in the common WWD format, as the translation is done by the carrier premises before its gets forwarded to the WWD network for further processing. The POP 658 may still determine whether conversion is required, as the session may have originated from a carrier that does not perform its own conversion. The core WWD infrastructure includes the components previously described in other embodiments.

An embodiment of the operation of the architecture of FIG. 10 will now be described with reference to FIG. 12. An incoming PTT request 620 is routed to regional inter-working components of the WWD architecture that service the originating PTT network. The regional inter-working components determine the appropriate WWD architecture components to handle the PTT session request, such as POP 600, in step 622. In step 624, if the PTT session requires translation then the proxy 602 routes the session to the signaling bridge 604 where it is converted to a common WWD protocol in step 626. In step 628, transcoders are selected for the PTT session, and then address and name translation is then performed via the controller 606 and the WWD core network 614 in step 630. If the session does not require translation then the proxy 602 bypasses steps 626 and 628. In step 632, the controller 606 determines the location of the target user(s), and in step 634 media server(s) are selected for the PTT session. The region of the target user(s) is determined in step 636. In step 638, if the PTT request requires translation then the request is converted from the common format to the target format in step 640. The PTT request is next forwarded to regional inter-working components servicing the target user(s), which may be located on a different POP, and then to the target carrier.

When the session is complete, the custom gateway releases allocated resources and terminates the PTT session. For example, if the originating caller hangs up, Carrier 1 transmits a call release message 644a to the WWD architecture, which transmits a call release message 644b to Carrier 2. During the PTT session, CDRs and UDRs are collected by the WWD architecture and published to the billing clearinghouse 645 for subsequent settlement processing 646 to allocate charges for the session. The billing clearinghouse subsequently publishes an invoice 648a to Carrier 1 and an invoice 648b to Carrier 2, including the allocated charges.

Figure 13:
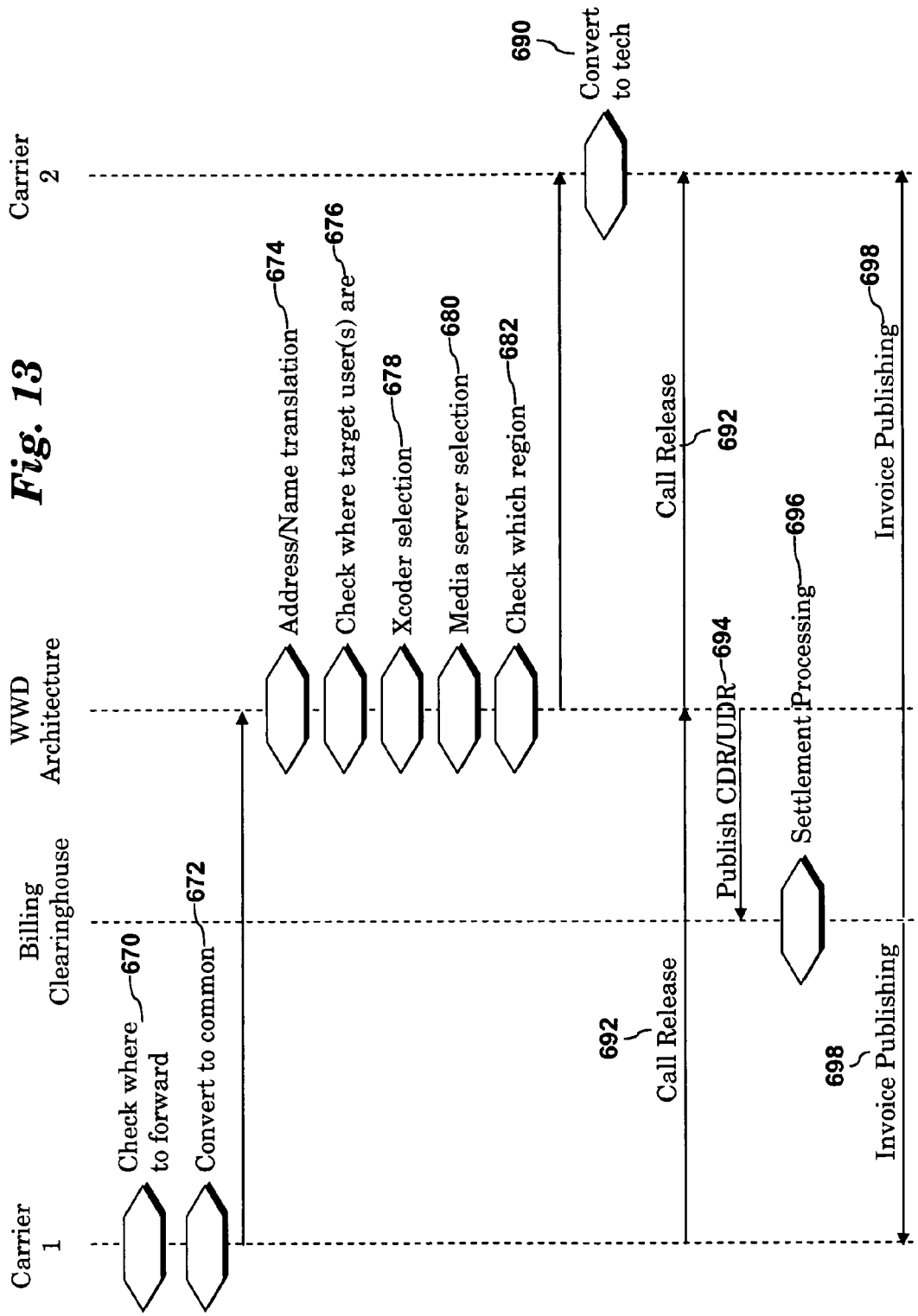
FIG. 13 is a call flow illustrating an operation of the PTT inter-working architecture of the fourth embodiment.

An embodiment of the operation of the architecture of FIG. 11 is illustrated in FIG. 13. In step 670, a local PTT carrier routes sessions either internally or to a proxy server depending on the technologies of the originating and terminating entities. If the terminating entity has the same technology then the session is forwarded without translation. If the terminating entity and originating entity operate using different technologies, then the signaling bridge 654 translates the session into the common WWD protocol in step 672 and forwards the session to the WWD network. The WWD network performs any necessary address and name translation in step 674, determines the target location in step 676, selects xcoder for the session in step 678, selects media servers for the session in step 680, and identifies the WWD target region in step 682. The WWD architecture determines whether the terminating carrier (1) uses the same technology, and thus requires no translation, (2) requires translation, or (3) handles translation in the carrier network. If the terminating carrier includes a proxy and signaling bridge then the message may be forwarded to the carrier in the common WWD format. In step 690, the terminating carrier performs any necessary conversion from the WWD format to the terminating carrier's technology.

When the session is complete the WWD architecture releases allocated resources and terminates the PTT session. For example, if the originating caller hangs up, Carrier 1 transmits a call release message 692 to the WWD architecture, which transmits the call release message to Carrier 2. The WWD architecture publishes CDRs and UDRs 694 collected during the session to the billing clearinghouse, which performs settlement processing 696 to allocate charges for the session. The billing clearinghouse subsequently publishes invoices 698 to Carriers 1 and 2.

Figure 14:
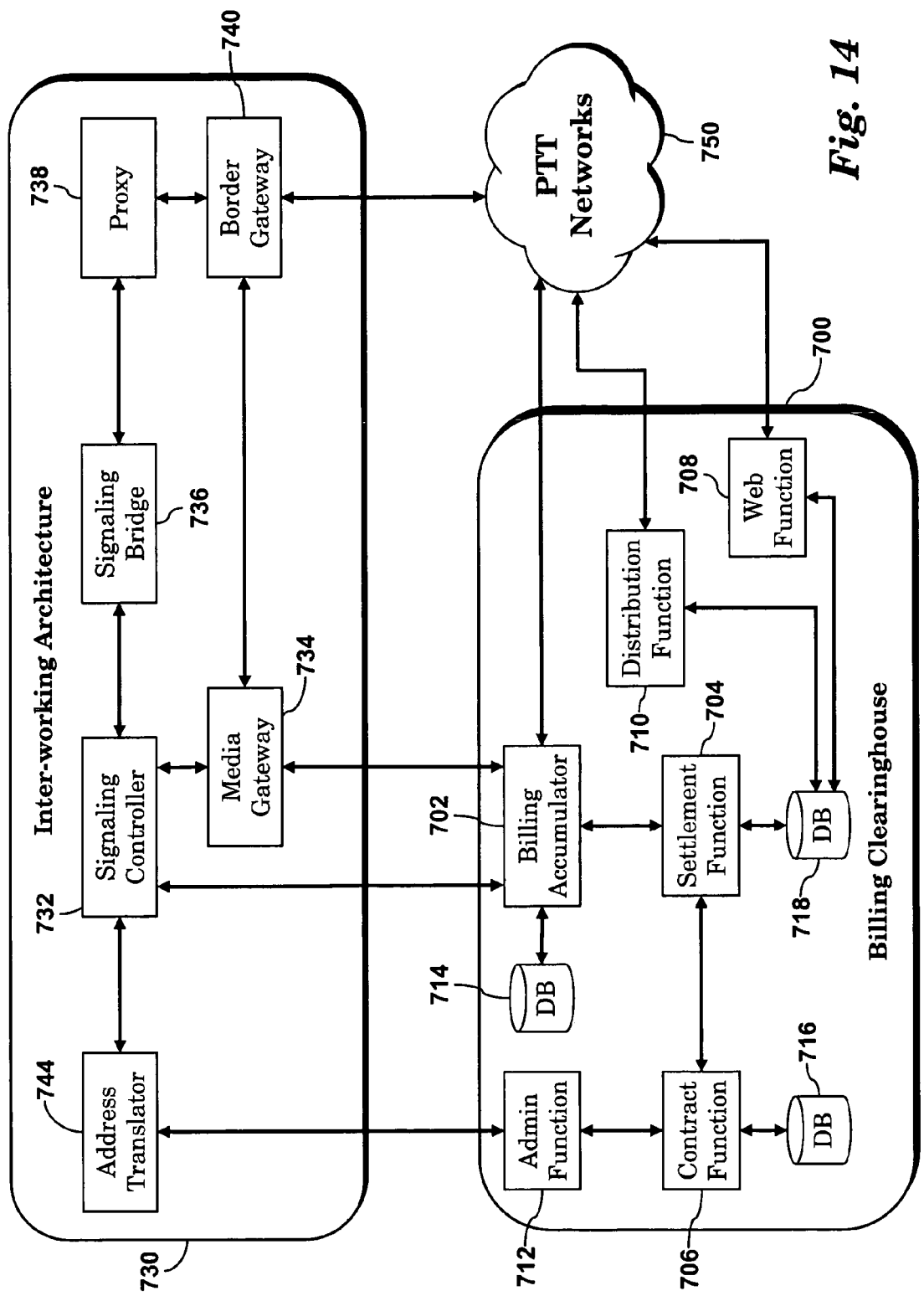
FIG. 14 is an embodiment of a billing clearinghouse architecture for a PTT inter-working architecture.

An embodiment of a billing clearinghouse architecture will now be described with reference to FIG. 14. A billing clearinghouse 700 includes a billing accumulator 702, a settlement function 704, a contract management function 706, a display/web function 708 and a distribution function 710. Each component of the billing clearinghouse 700 may be implemented as software or hardware on one or more servers.

The billing accumulator 702 receives PTT call data, including UDRs and CDRs, from the signaling controller 732 and signaling gateway 734 and applies settlement logic to PTT call data as defined by the settlement function 704. The billing accumulator 702 stores PTT call data in a database 714 adapted for failsafe operation and maintains the integrity of the raw PTT call data. In one embodiment, the billing accumulator 702 periodically retrieves PTT call data via secure FTP from the inter-working architecture 730.

Each PTT network 750 stores PTT call data for local PTT callers and bills its own subscribers through a local billing system (not shown). The billing accumulator 702 may also include an interface to the individual PTT networks 750, through which the billing accumulator 702 may receive CDRs/UDRs associated with single network PTT calls that include one or more roaming subscribers, for billing the roaming subscriber's home network and performing reconciliation and fraud analysis. The billing accumulator 702 may also transfer CDRs/UDRs between carriers for audit purposes.

The settlement function 704 transforms PTT call data from the billing accumulator 702 into inter-carrier billing data by applying negotiated rules and inter-carrier policies. The settlement function 704 queries the rules and policies for billing an associated PTT call from the contract management function 706. In one embodiment, each PTT call data record includes two or more associated PTT networks 750 that participated in the PTT call and will be billed for the use of the inter-working architecture 730. The costs of the PTT call may be split among the associated PTT networks according to negotiated rules between the PTT networks, and the rules established by the operator of the inter-working architecture. For example, the PTT carriers may have different billing models and an inter-working PTT call may be billed based on the duration of the PTT call, roaming charges, the number of pushes of the PTT button by individual participants, number of participants in the group, the number of carriers involved in the call, the number of transmitted bytes, allocated transcoding resources, and other defined charges. The billing data is stored in a database 718, from which the settlement function 704 generates settlement invoices for the PTT carriers. Billing data identifying each subscriber's transactions may be provided to each PTT carrier to pass along the costs to its subscribers.

The contract management function 706 stores and manages inter-carrier terms and conditions in the form of rules of logic for implementation by the settlement function 704 to perform reconciliation. The terms and conditions are negotiated between individual PTT carriers and may differ for each PTT call depending on negotiated billing criteria such as an identity of the originating PTT carrier, identity of the terminating PTT carriers, floor time associated with each PTT caller, call duration, and number of participating PTT callers connected through the inter-working architecture and other criteria discussed above The web function 708 provides individual carriers with secure online access to settlement invoices and PTT call data stored in database 718 for viewing and downloading. The distribution function 710 distributes settlement invoices to the carriers. In one embodiment, a secure FTP or SMTP server is used to exchange stored invoice data with the carriers, such as via ftp or email. The raw CDRs may also be accessed or distributed through a secured web FTP interface.

The administrative function 712 is connected to the address translator 744 via an interface for providing subscriber name translations to the billing clearinghouse 700. The administrative function 712 is also interfaced with the contract function 706 to provision the inter-carrier peering rules and tariffs for settlement function.

Figure 15:
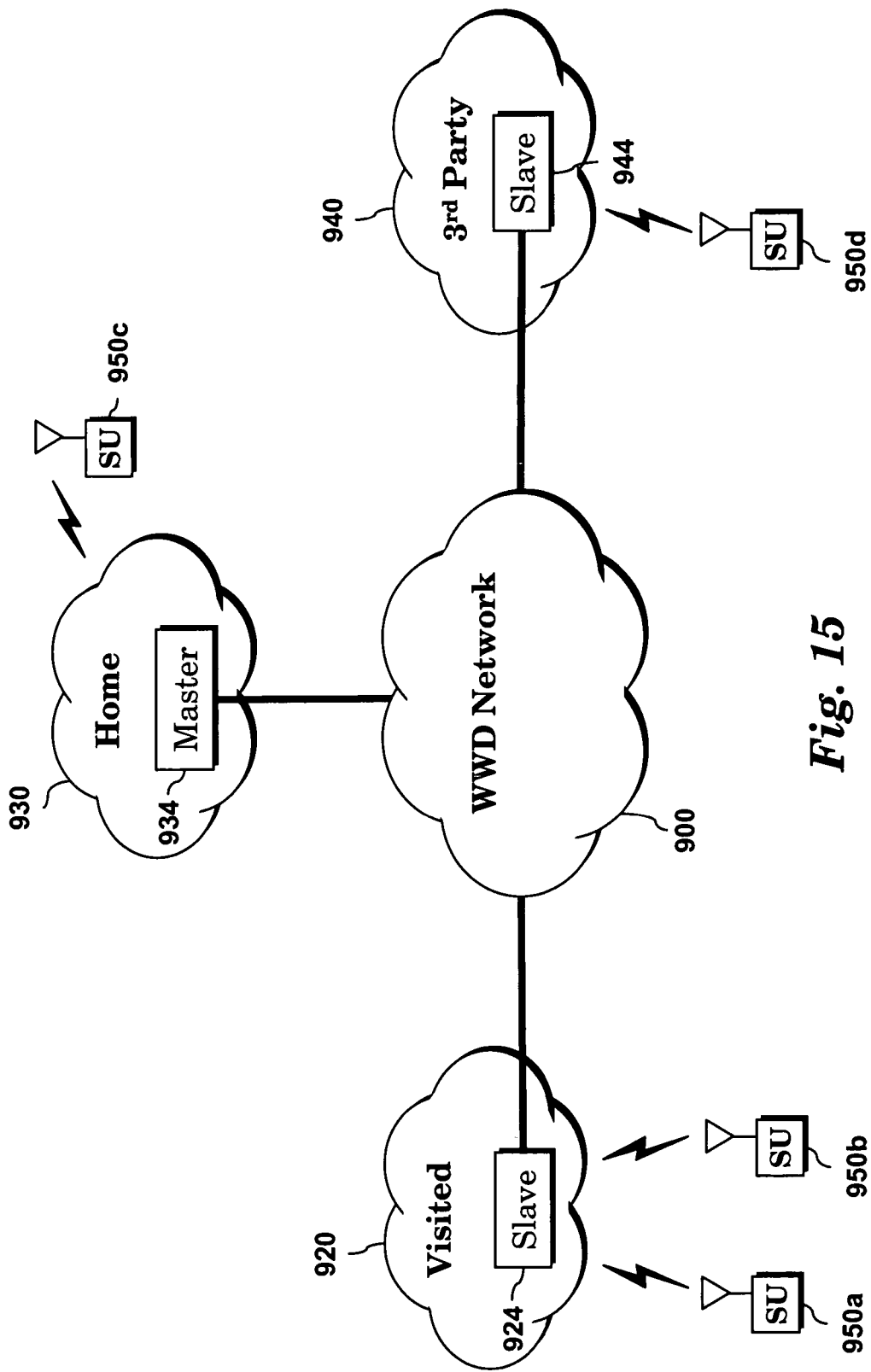
FIG. 15 illustrates an embodiment of an inter-working roaming architecture.

Referring to FIG. 15, an embodiment for facilitating roaming of PTT subscribers will now be described. A WWD network 900 connects a plurality of PTT networks, including a home network 930 for a subscriber unit 950a, a visited network 920 and a third-party network 940. In this embodiment, the PTT service for roaming subscriber unit 950a is controlled by the home network 930. A PTT session request from the roaming subscriber unit 950a is received by the visited network 920 and passed to the WWD network 900, and in turn, to the home network 930. The WWD network 900 determines whether the incoming request is from a roaming subscriber or a subscriber located in its home network. The use of a temporary address of record (or its equivalent) assists the WWD network in making this determination. The home PTT server 934 provides the requested PTT service.

Incoming requests from other carriers to the roaming subscriber 905a are translated and forwarded by the WWD network 900 to the home network 930, which will forward the request to the roaming subscriber 950a via the WWD network 900. The PTT server may function as a back-to-back user agent (B2BUA) translating between the roaming subscriber 950a's actual address of record (AOR) and the temporary roaming AOR. In one embodiment, the WWD network 900 provides a cut-through via its PTT servers; however this may necessitate that the WWD network 900 determine if the user is roaming or not for every session that traverses it.

Figure 16A:
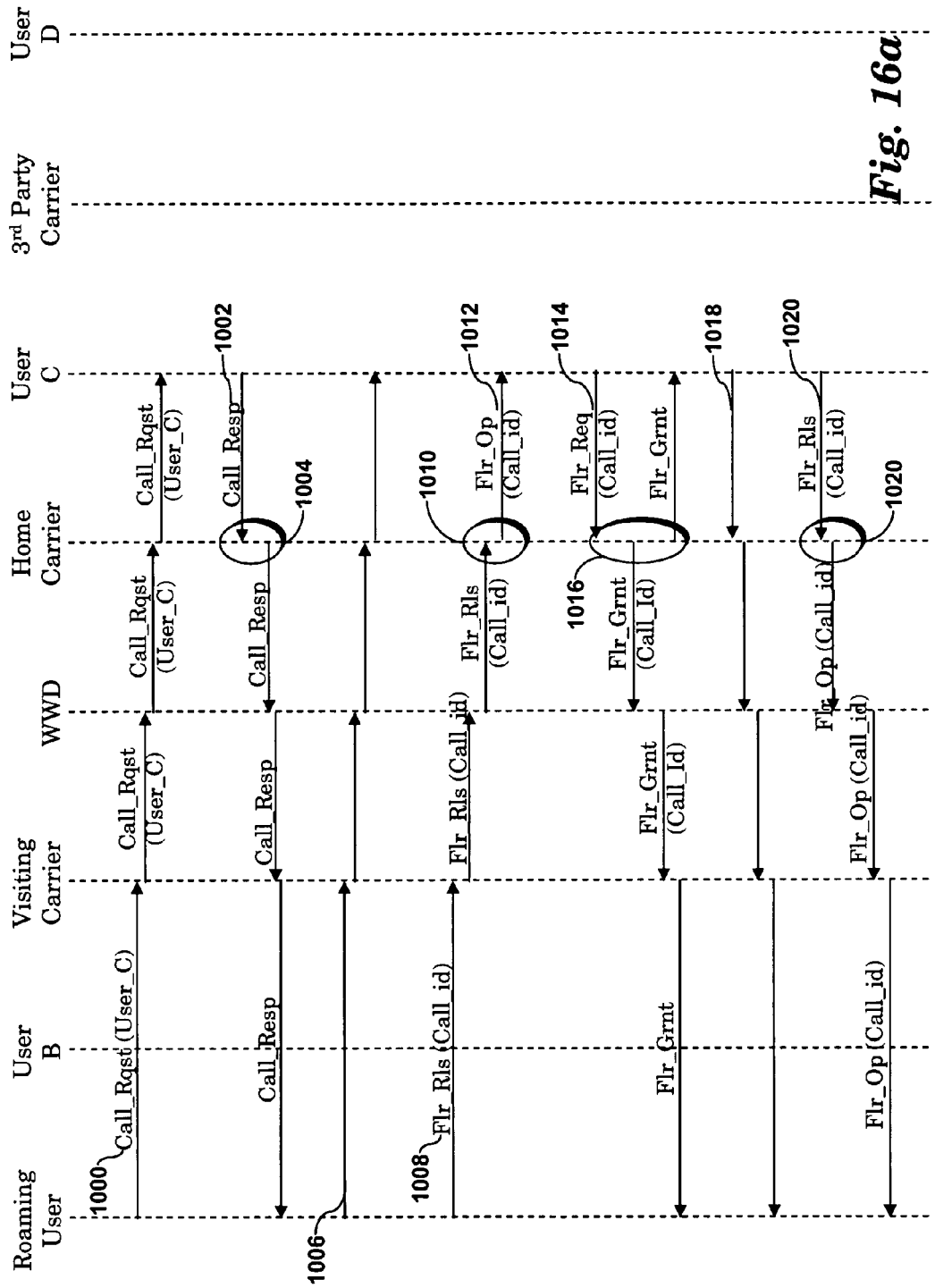

Referring to FIGS. 16a-c, call flow embodiments for FIG. 15 will now be described in further detail. In FIG. 16a, the roaming user initiates a PTT call request in step 1000 to initiate a call with User_C on the roaming user's home network. The call request is received by the visiting carrier and forwarded to the WVVWD network. The WWD network forwards the call request to the roaming subscriber's home carrier, which notifies User_C. In step 1002, User_C responds to the PTT call request and the home carrier, in step 1004, transmits a response message back to the roaming user through the WWD network. In step 1006, the roaming user has the floor and voice communications are transmitted from the roaming user to the User_C through the visiting carrier, WWD network and then the home carrier.

In step 1008, the roaming user releases the floor and a floor release message is transmitted from the roaming user, to the visiting carrier, which in turn transmits the floor release message to the home carrier via the WWD network. The home carrier, in step 1010, releases the floor and transmits a floor open message to the User_C. As illustrated, with the floor open User_C requests the floor in step 1014. The floor request is forwarded to the home carrier which grants the floor in step 1016, and transmits a floor grant message to User_C, directly, and to the roaming user, via the WWD network and the visiting carrier network. While User_C has the floor (step 1018), voice communications are transmitted from User_C to the home carrier, which forwards the communications to the WWD network, which in turn forwards the voice communications to visiting network for forwarding to the roaming subscriber.

In FIG. 16b, the roaming user initiates a PTT call with User_D on a third party carrier network. A call request is received in step 1100 by the visiting carrier and forwarded to the WWD network. The WWD network forwards the call request to the roaming subscriber's home carrier, which notifies User_D through the WWD network and third party carrier in step 1102. In step 1104, User_D responds to the PTT call request. The request is transmitted from the third party carrier to the WWD network, which forwards the message to the home network. The home network transmits the call_resp message to the roaming subscriber via the WWD network and the visiting carrier. In step 1106, the roaming user has the floor and voice communications are transmitted from the roaming user to the User_D through the visiting carrier, WWD network and then the home carrier, which transmits the voice communications back to the WWD network for transmission to the User_D through the third party carrier.

In step 1108, the roaming user releases the floor and a floor release message is transmitted from the roaming user to the visiting carrier, which transmits the floor release message to the WWD network, which in turn forwards the floor release message to the home carrier. The home carrier, in step 1110, releases the floor and transmits a floor open message to the User_D. As illustrated, with the floor open User_D requests the floor in step 1112. The floor request is forwarded to the home carrier through the third party carrier. The home carrier grants the floor in step 1114, and transmits a floor grant message to User_D, via the WWD network and third party carrier, and to the roaming user via the WWD network and the visiting carrier network. While User_D has the floor (step 1116), voice communications are transmitted from User_D to the third party carrier, which forwards the voice communications to the WWD network, which in turn forwards the voice communications to the home network. The home network transmits the voice communications to the WWD for delivery to the roaming user through the visiting carrier. In step 1118, User_D releases the floor and a Flr_Rls message is transmitted to the home carrier through the third party carrier and WWD network. The home carrier, in step 1120, releases the floor and transmits a Flr_Op message to the roaming user via the WWD network and the visiting carrier.

In FIG. 16c, the roaming user initiates a PTT call with User_B on the visiting carrier network. A call request is received in step 1150 by the visiting carrier and forwarded to the WWD network. The WWD network forwards the call request to the roaming subscriber's home carrier, which notifies User_B through the WWD network and visiting carrier in step 1152. In step 1154, User_B responds to the PTT call request. The request is transmitted from the visiting carrier to the WWD network, which forwards the message to the home network. The home network transmits the call_resp message to the WWD network, which transmits the message to the roaming subscriber through the visiting carrier. In step 1156, the roaming user has the floor and voice communications are transmitted from the roaming user to the User_B through the visiting carrier, WWD network and then the home carrier, which transmits the voice communications back to the WWD network for transmission to the User_B through the visiting carrier.

In step 1158, the roaming user releases the floor and a floor release message is transmitted from the roaming user to the visiting carrier, which transmits the floor release message to the WWD network, which in turn forwards the floor release message to the home carrier. The home carrier, in step 1160, releases the floor and transmits a floor open message to the User_B. As illustrated, with the floor open User_B requests the floor in step 1162. The floor request is forwarded to the home carrier through the visiting carrier and WWD network. The home carrier grants the floor in step 1164, and transmits a floor grant message to User_B, via the WWD network and visiting carrier, and to the roaming user via the WWD network and the visiting carrier network. While User_B has the floor (step 1166), voice communications are transmitted from User_B to the visiting carrier, which forwards the voice communications to the WWD network, which in turn forwards the voice communications to the home network. The home network transmits the voice communications to the WWD for delivery to the roaming user through the visiting carrier. In step 1168, User_B releases the floor and a Flr_Rls message is transmitted to the home carrier through the visiting carrier and WWD network. The home carrier, in step 1170, releases the floor and transmits a Flr_Op message to the roaming user via the WWD network and the visiting carrier.

Figure 17:
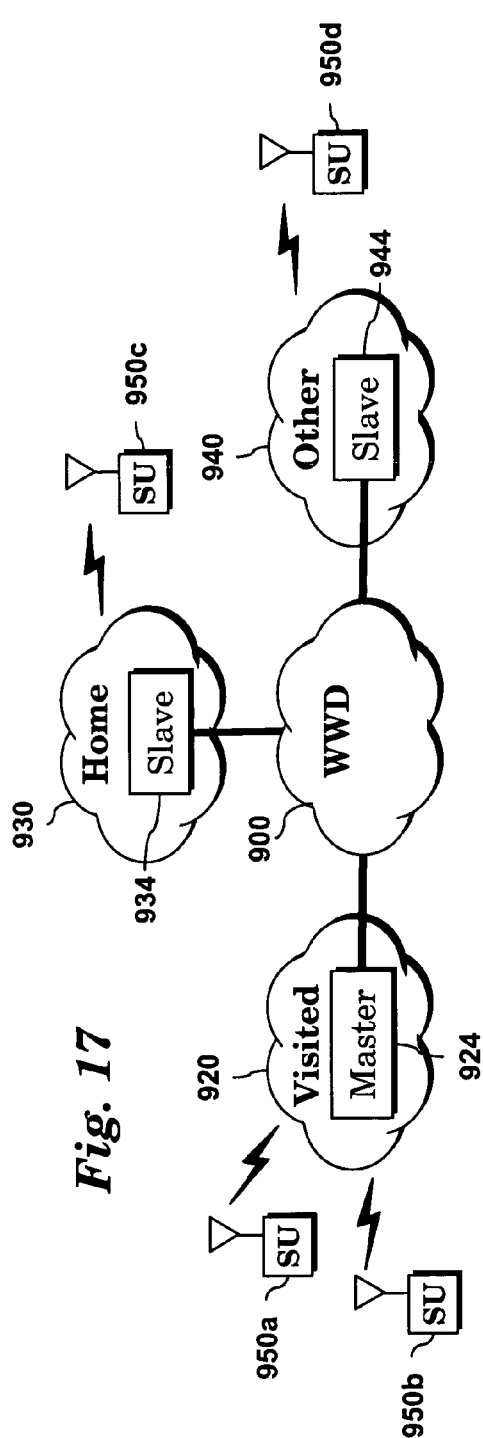
FIG. 17 illustrates another embodiment of an inter-working roaming architecture.

Referring to FIG. 17, another embodiment of a roaming architecture will be described. In this embodiment, the PTT service is controlled by the visited network 920. The visited network 920 operates as a master PTT server 924 for the session and controls PTT originations. The local PTT servers 924 arbitrate the floor for the duration of the PTT session. In this embodiment, the WWD network 900 is used for calls terminating to the home network 930 or third party PTT carriers 940. The WWD network 900 is also used to pass or control PTT originations for subscribers that have roamed onto carriers that do not support the same PTT technology as the home network 930. The PTT calls to the roaming subscriber 950a are transparent to the WWD network 900. The WWD network may be able to cut through the calls originated from other carriers to enhance the latency performance as described with reference to FIG. 15.

Figure 18A:
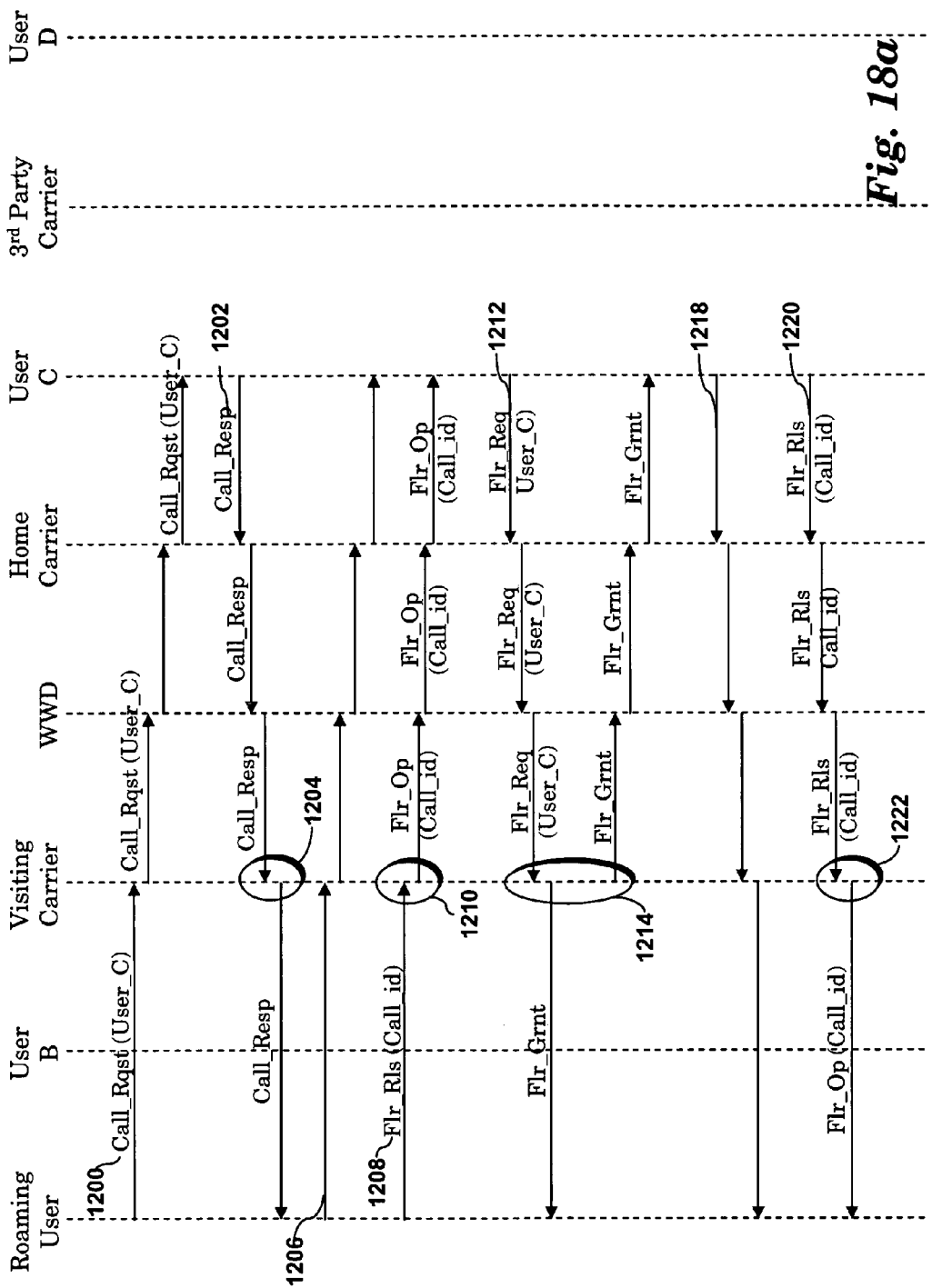
FIGS. 18a-c are call flows illustrating embodiments of the inter-working roaming architecture of FIG. 18.
Figure 18B:
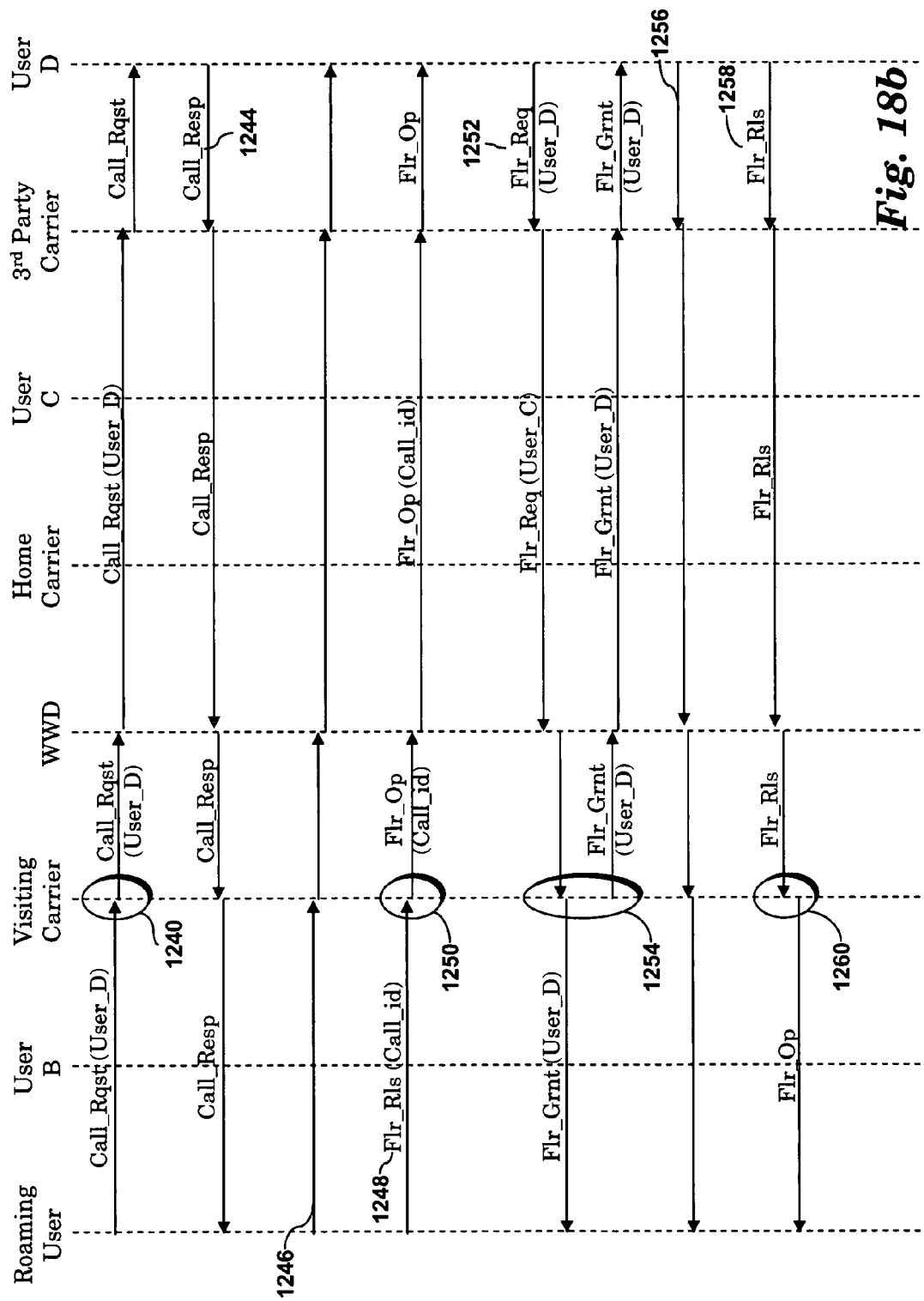
Figure 18C:
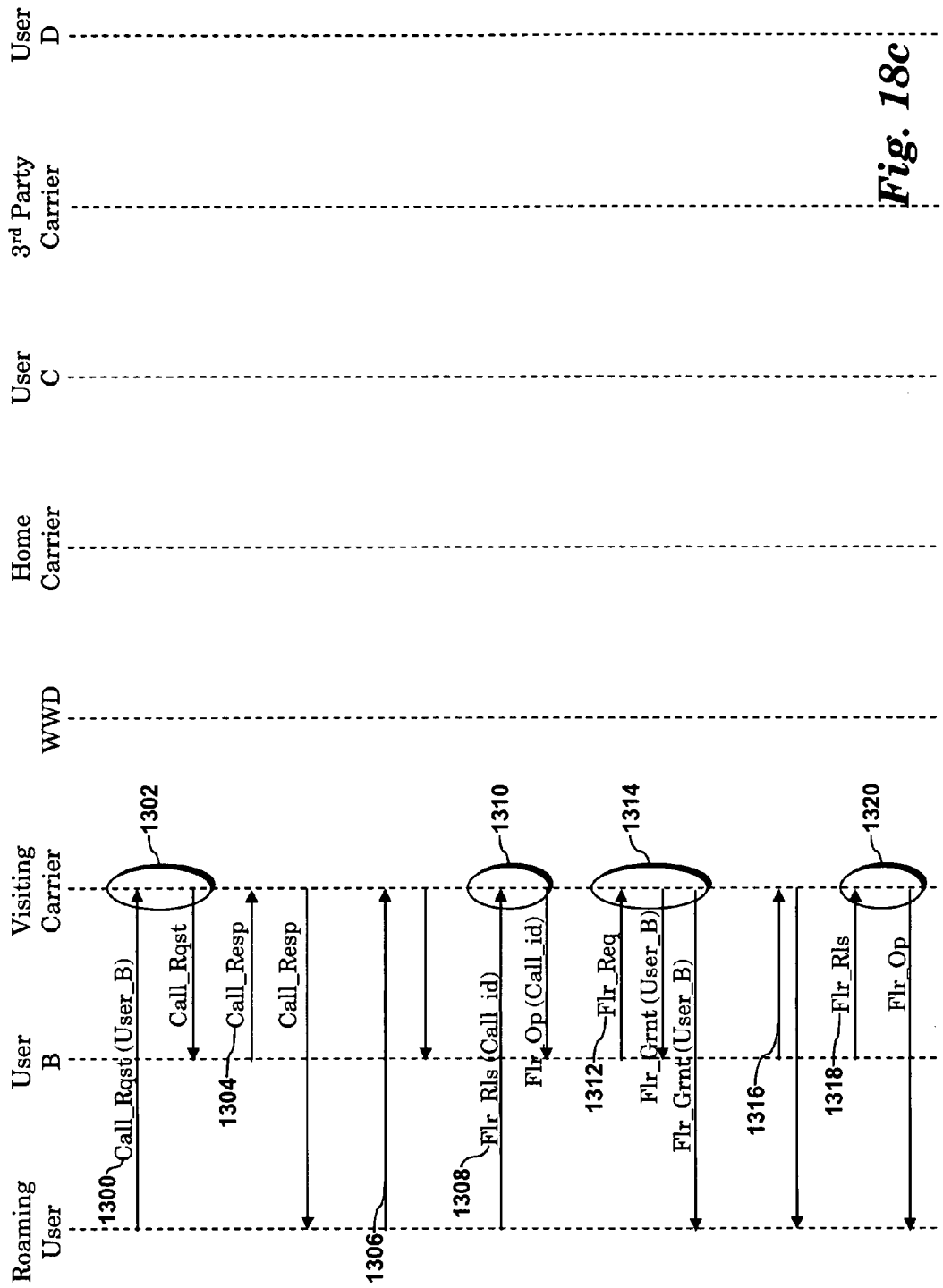

Referring to FIGS. 18a-c, call flow embodiments for FIG. 17 will now be described in further detail. In FIG. 18a, the roaming user initiates a PTT call in step 1200 with User_C on the roaming user's home network. The call request is received by the visiting carrier and forwarded to the WWD network. The WWD network forwards the call request to the roaming subscriber's home carrier, which notifies User_C. In step 1202, User_C responds to the PTT call request and the home carrier transmits a response message back to the roaming user through the visiting carrier (step 1204). In step 1206, the roaming user has the floor and voice communications are transmitted from the roaming user to the User_C through the visiting carrier, WWD network and then the home carrier.

In step 1208, the roaming user releases the floor and a floor release message is transmitted from the roaming user, to the visiting carrier, which releases the floor the transmits a Flr_Op message in step 1210 to User_C through the WWD network and the home carrier. As illustrated, with the floor open User_C requests the floor in step 1212. The floor request is forwarded to the home carrier which transmits the request to the visiting carrier via the WWD network. The visiting carrier grants the floor to User_C in step 1214 and transmits a floor grant message to the roaming user, directly, and to User_C via the WWD network and the home carrier network. While User_C has the floor (step 1218), voice communications are transmitted from User_C to the home carrier, which forwards the communications to the WWD network, which in turn forwards the voice communications to visiting network for forwarding to the roaming subscriber. In step 1220, the User_C releases the floor and a Flr_Rls message is transmitted to the WWD network via the home carrier, and then to the visiting carrier. The visiting carrier releases the floor and transmits a Flr_Op message to the roaming user in step 1222.

In FIG. 18b, the roaming user initiates a PTT call with User_D on a third party carrier network. A call request is received in step 1240 by the visiting carrier and forwarded to the WWD network. The WWD network forwards the call request to the third party carrier, which notifies User_D. In step 1244, User_D responds to the PTT call request. The request is transmitted from the third party carrier to the WWD network, which forwards the message to the visiting carrier, which transmits the message to the roaming subscriber. In step 1246, the roaming user has the floor and voice communications are transmitted from the roaming user to the User_D through the visiting carrier, WWD network and then the third party carrier.

In step 1248, the roaming user releases the floor and a floor release message is transmitted from the roaming user to the visiting carrier. The visiting carrier, in step 1250, releases the floor and transmits a floor open message to the User_D via the WWD network and third party network. As illustrated, with the floor open User_D requests the floor in step 1252. The floor request is forwarded to the visiting carrier through the third party carrier and WWD network. The visiting carrier grants the floor in step 1254, and transmits a floor grant message to User_D, via the WWD network and third party carrier, and to the roaming user, directly. While User_D has the floor (step 1256), voice communications are transmitted from User_D to the third party carrier, which forwards the voice communications to the WWD network, which in turn forwards the voice communications to the visiting network. The visiting network transmits the voice communications to the roaming. In step 1258, User_D releases the floor and a Flr_Rls message is transmitted to the visiting carrier through the third party carrier and WWD network. The visiting carrier, in step 1260, releases the floor and transmits a Flr_Op message to the roaming user.

In FIG. 18c, the roaming user initiates a PTT call with User_B on the visiting carrier network. A call request is received in step 1300 by the visiting carrier, which notifies User_B in step 1302. In step 1304, User_B responds to the visiting network with a Call_Resp message, which responds to the roaming user. In step 1306, the roaming user has the floor and voice communications are transmitted from the roaming user to the User_B through the visiting carrier. In step 1308, the roaming user releases the floor and a floor release message is transmitted from the roaming user to the visiting carrier. The visiting carrier, in step 1310, releases the floor and transmits a floor open message to the User_B. As illustrated, with the floor open User_B requests the floor in step 1312. The floor request is forwarded to the visiting carrier which grants the floor in step 1314, and transmits a floor grant message to User_B and to the roaming user. While User_B has the floor (step 1316), voice communications are transmitted from User_B to the visiting carrier, which forwards the voice communications to the roaming user. In step 1318, User_B releases the floor and the visiting carrier transmits a Flr_Op message to the roaming in step 1320.

Figure 19:
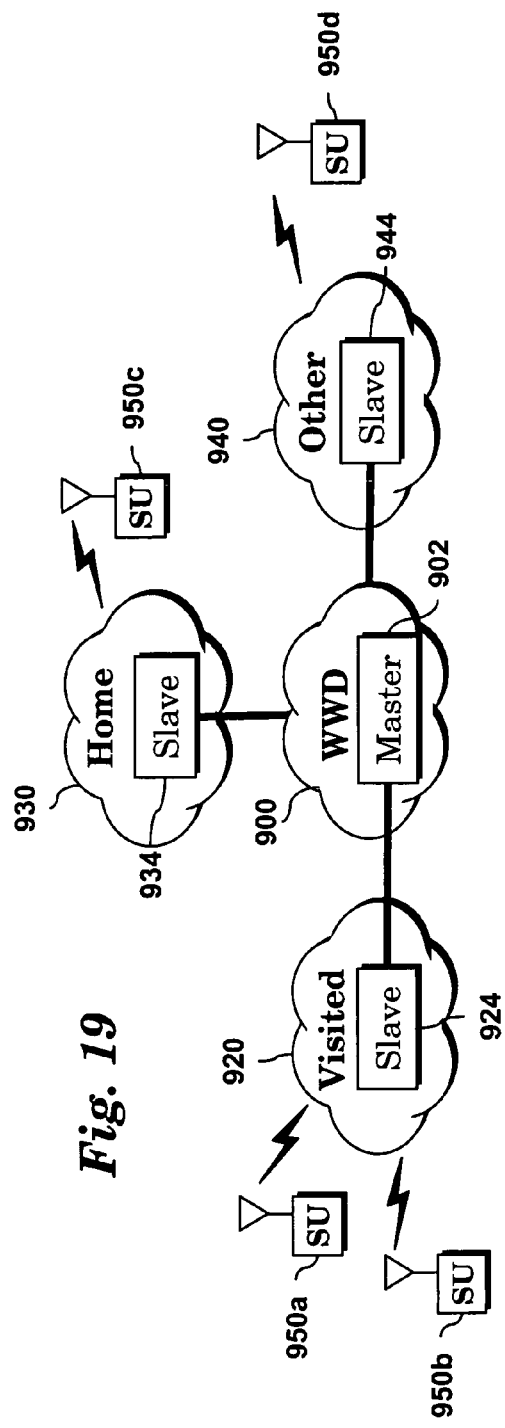
FIG. 19 illustrates another embodiment of an inter-working roaming architecture.

Referring to FIG. 19, another embodiment of a roaming architecture will be described. In this embodiment, all call originations from roaming subscribers, irrespective of the PTT technologies supported within the foreign carrier, are managed by PTT servers 902 hosted in the WWD network 900. The WWD network 900 arbitrates the floor and manages the media resources.

Figure 20A:
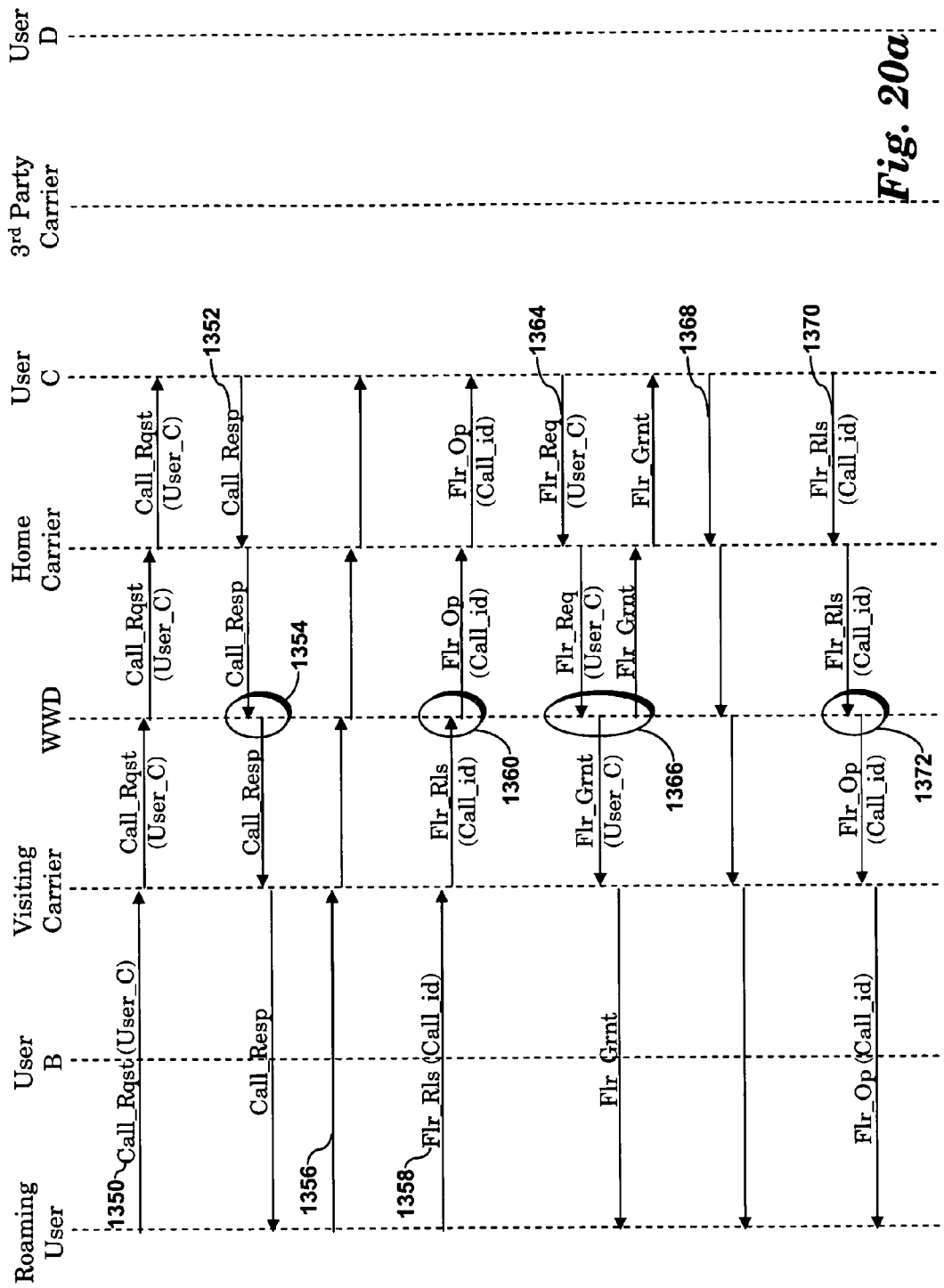
FIGS. 20a-c are call flows illustrating embodiments of the inter-working architecture of FIG. 19.
Figure 20B:
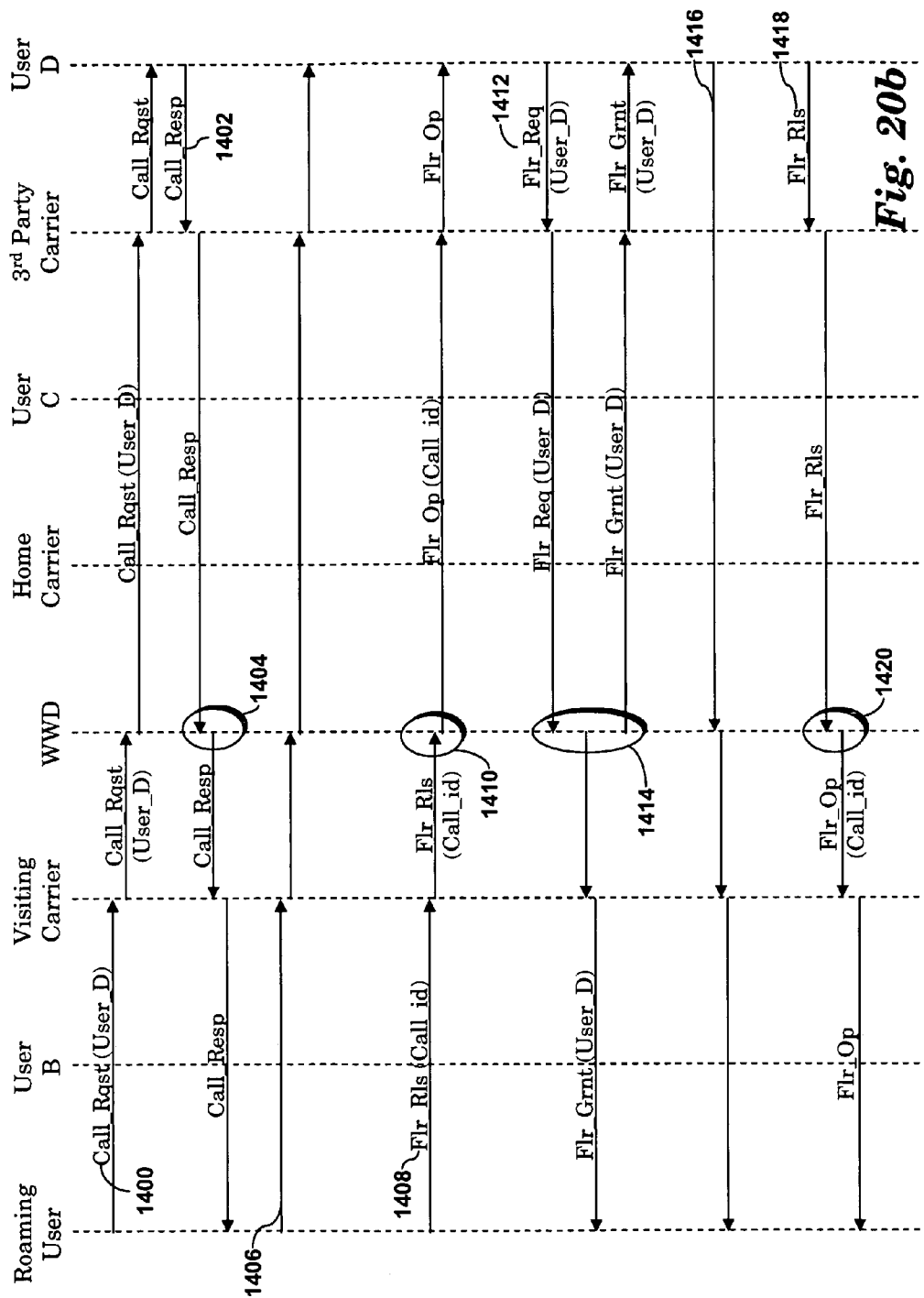
Figure 20C:
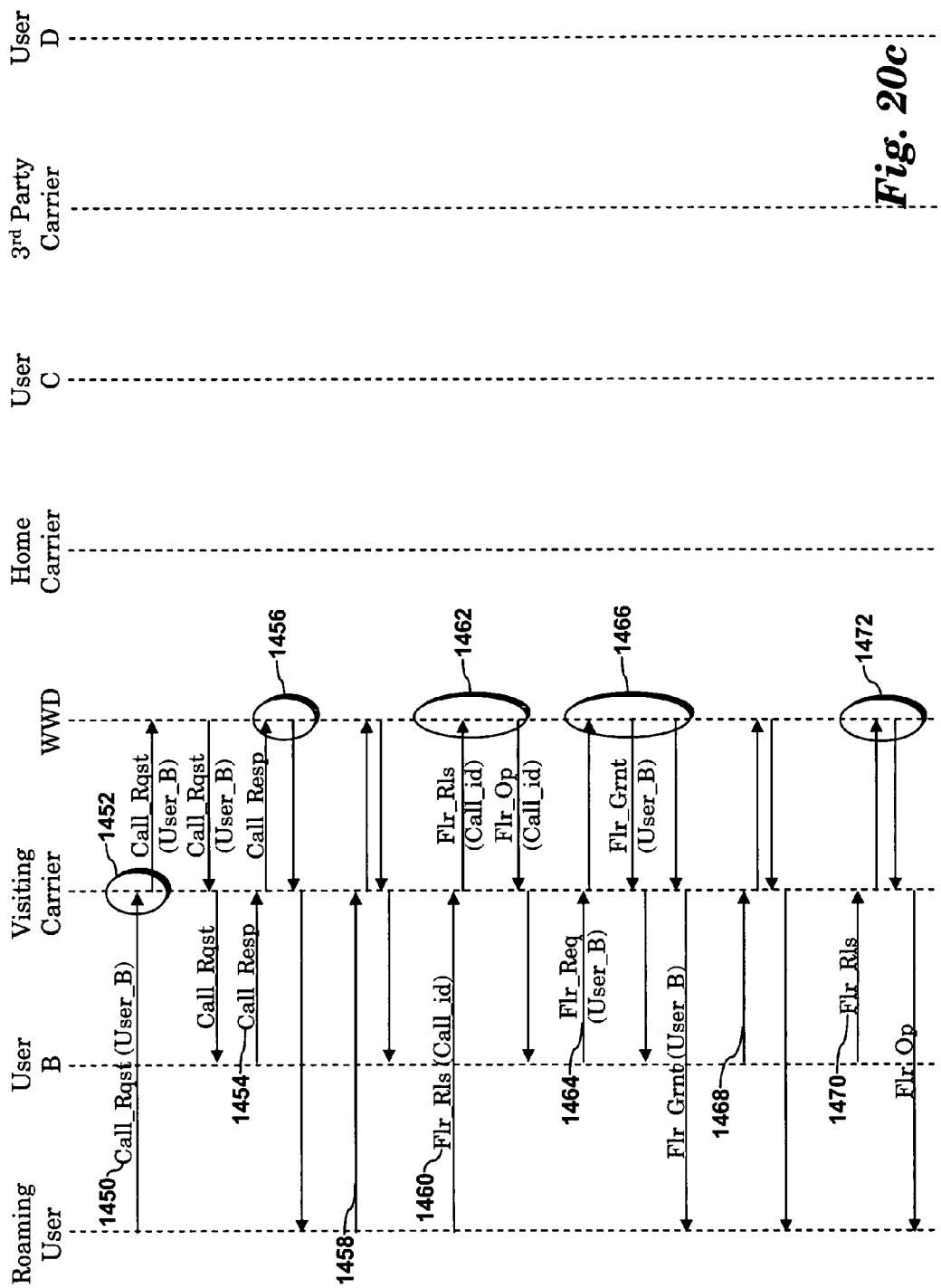

Referring to FIGS. 20a-c, call flow embodiments for FIG. 19 will now be described in further detail. In FIG. 20a, the roaming user initiates a PTT call in step 1350 with User_C on the roaming user's home network. The call request is received by the visiting carrier and forwarded to the WWD network. The WWD network forwards the call request to the roaming subscriber's home carrier, which notifies User_C. In step 1352, User_C responds to the PTT call request and the home carrier transmits a response message back to the WWD network. In step 1354, the WWD network notifies the roaming subscriber that the call setup is complete. In step 1356, the roaming user has the floor and voice communications are transmitted from the roaming user to the User_C through the visiting carrier, WWD network and then the home carrier.

In step 1358, the roaming user releases the floor and a floor release message is transmitted from the roaming user to the visiting carrier, which in turn transmits the floor release message to the WWD network. The WWD network, in step 1360, releases the floor and transmits a floor open message to the User_C through the home carrier. As illustrated, with the floor open User_C requests the floor in step 1364. The floor request is forwarded to the WWD network via the home carrier, and the WWD network grants the floor in step 1366 and transmits a floor grant message to User_C via the home network, and to the roaming user via the visiting carrier network. While User_C has the floor (step 1368), voice communications are transmitted from User_C to the home carrier, which forwards the communications to the WWD network, which in turn forwards the voice communications to visiting network for forwarding to the roaming subscriber. In step 1370, User_C releases the floor and a Flr_Rls message is transmitted to the WWD network via the home carrier. The WWD network, in step 1372, releases the floor and transmits a Flr_Op message to the roaming user via the visiting carrier.

In FIG. 20b, the roaming user initiates a PTT call with User_D on a third party carrier network. A call request is received in step 1400 by the visiting carrier and forwarded to User_D via the WWD network and third party carrier. In step 1402, User_D responds to the PTT call request. The request is transmitted from the third party carrier to the WWD network, which in step 1404 forwards the message to the roaming user via the visiting network. In step 1406, the roaming user has the floor and voice communications are transmitted from the roaming user to the User_D through the visiting carrier, WWD network and then the third party carrier.

In step 1408, the roaming user releases the floor and a floor release message is transmitted from the roaming user to the visiting carrier, which transmits the floor release message to the WWD network. The WWD network, in step 1410, releases the floor and transmits a floor open message to User_D via the third party carrier. As illustrated, with the floor open User_D requests the floor in step 1412. The floor request is forwarded by the third party carrier to the WWD network, which grants the floor in step 1414 and transmits a floor grant message to User_D, via the third party carrier, and to the roaming user via the visiting carrier network. While User_D has the floor (step 1416), voice communications are transmitted from User_D to the roaming user via the third party carrier, WWD network, and the visiting carrier. In step 1418, User_D releases the floor and a Flr_Rls message is transmitted to the WWD network through the third party carrier. The WWD network, in step 1420, releases the floor and transmits a Flr_Op message to the roaming user via the visiting carrier.

In FIG. 20c, the roaming user initiates a PTT call with User_B on the visiting carrier network. A call request is received in step 1450 by the visiting carrier and forwarded to the WWD network in step 1452. The WWD network forwards the call request to User_B through the visiting carrier. In step 1454, User_B responds to the PTT call request. The request is transmitted from the visiting carrier to the WWD network, which forwards the message to the roaming subscriber through the visiting carrier in step 1456. In step 1458, the roaming user has the floor and voice communications are transmitted from the roaming user to User_B through the visiting carrier, WWD network and then back to the visiting carrier.

In step 1460, the roaming user releases the floor and a floor release message is transmitted from the roaming user to the visiting carrier, which transmits the floor release message to the WWD network. The WWD network, in step 1462, releases the floor and transmits a floor open message to User_B. As illustrated, with the floor open User_B requests the floor in step 1464. The floor request is forwarded to the WWD network which grants the floor in step 1466, and transmits a floor grant message to User_B and the roaming user via the visiting carrier. While User_B has the floor (step 1468), voice communications are transmitted from User_B to the visiting carrier, which forwards the voice communications to the WWD network. The WWD network forwards the voice communications back to the visiting carrier for transmission to the roaming user. In step 1470, User_B releases the floor and a Flr_Rls message is transmitted to the WWD network. The WWD network, in step 1472, releases the floor and transmits a Flr_Op message to the roaming user via the visiting carrier.

Each of the roaming architecture embodiments offers certain advantages. The embodiment of FIG. 15 allows the home carrier 930 full control over the PTT offering to its subscribers, even when the subscribers are roaming. From the subscriber perspective, a consistent PTT feature set is maintained irrespective of the PTT offering of the visited carrier 920. This embodiment may be characterized with higher latencies for calls terminating on a third party network. The embodiment of FIG. 17 allows the visited carrier 920 full control over the PTT sessions of roaming users. This option improves the latencies over the embodiment of FIG. 15, but is generally limited to use on PTT networks that use the same PTT technologies as their home network, and the feature set supported by the foreign PTT network may not match the home network, thereby degrading the user experience. Another drawback is that the WWD network 900 is bypassed when calls are made by the roaming user to another user in the visited network, thus losing a potential revenue source for the WWD network 900.

In the embodiment of FIG. 19, the WWD network 900 functions as the PTT session controller, thereby providing higher revenue potential than the other embodiments. One potential drawback of this architecture is that the path setup may be sub-optimal for calls initiated by the roaming user to other users residing in the visited network. Also, this embodiment potentially requires modification to the PTT infrastructure deployed by various carriers.

During roaming sessions as illustrated in FIGS. 15-20c, the WWD network creates call data records and usage detail reports for communications facilitated through the WWD network. After call completion, the billing clearinghouse aggregates the CDRs and UDRs, performs settlement processing to allocate charges for the roaming session to participating carriers, including the home carrier of the roaming subscriber, and publishes an invoice to each carrier.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. An inter-working network for facilitating dispatch communications between a plurality of dispatch networks, at least two of the dispatch networks having incompatible technologies, the inter-working network comprising:
   an integrated dispatch enhanced network that is a first of the at least two dispatch networks;
   a high performance push-to-talk network that is a second of the at least two dispatch networks, wherein the inter-working network is adapted to facilitate dispatch communications between roaming subscribers on the integrated dispatch enhanced network and roaming subscribers on the high performance push-to-talk network;
   a core inter-working network;
   a plurality of points-of-presence connected to the core inter-working network; and
   a plurality of border gateways interfacing each of the dispatch networks to at least one of the plurality of points-of-presence;

wherein the points-of-presence facilitate roaming of subscribers on the dispatch networks by translating dispatch session messages received from an originating dispatch network into a common signaling format before session processing, and translating dispatch session messages from the common signaling format into a format compatible with a target dispatch network.

2. The inter-working network of claim 1 wherein the core inter-working network further includes a centralized database storing call detail records and usage data reports relating to dispatch sessions including at least one roaming subscriber; and a billing clearinghouse for receiving the call detail records and usage data reports and generating invoices for each of the dispatch networks, including roaming charges for the roaming subscriber.

3. The inter-working network of claim 1 wherein at least one point-of-presence includes a signaling bridge adapted to perform said translating dispatch session messages received from an originating dispatch network into a common signaling format before session processing; and perform said translating the dispatch session messages from the common signaling format into a format compatible with a target dispatch network.

4. The inter-working network of claim 1 wherein the at least one point-of-presence further includes a proxy server adapted to receive an incoming dispatch request from a roaming subscriber on the originating dispatch network and determine whether translation is required between signaling formats of the originating and target dispatch networks, wherein translation by the signaling bridge is performed when the proxy server determines that translation is required, and wherein dispatch session messages are not translated by the signaling bridge when the proxy server determines that translation is not required.

5. An inter-working network for facilitating dispatch communications between a plurality of dispatch devices including at least one roaming device, and a plurality of dispatch networks having a separate administrative domain and operating on at least one of a plurality of technologies, comprising:

an integrated Dispatch Enhanced Network that is a first of the plurality of dispatch networks;

a high performance push-to-talk network that is a second of the plurality of dispatch networks, wherein the inter-working network is adapted to facilitate dispatch communications between roaming subscribers on the integrated Dispatch Enhanced Network and roaming subscribers on the high performance push-to-talk networks;

a plurality of interfaces facilitating communications with each of the plurality of dispatch networks;

a signaling bridge adapted to translate dispatch session messages received from an originating dispatch network into a common signaling format before session processing, and translate dispatch session messages from the common signaling format into a format compatible with a target dispatch network;

a signaling controller interfaced with the signaling bridge, the signaling controller adapted to manage a dispatch session between the originating dispatch network and at least one target dispatch network;

a media gateway interfaced with the signaling controller, the media gateway adapted to convert real-time media between the originating dispatch network and the target dispatch network; and a group server interfaced with at least one group server in each of the plurality of dispatch networks, the group server managing inter-working group calls.

6. The inter-working network of claim 5 further comprising a proxy server interfaced with the signaling bridge and the signaling controller, the proxy server adapted to facilitate a communication between the originating and target dispatch networks without translation when the originating and target dispatch networks use compatible dispatch technologies, wherein the proxy server routes an incoming dispatch session to the signaling bridge for translation when the originating and target dispatch networks use incompatible technologies.

7. The inter-working network of claim 5 wherein the interfaces include a border gateway that manages communications between the inter-working architecture and the dispatch networks.

8. The inter-working network of claim 5 further comprising a billing clearinghouse adapted to collect call data for a dispatch session between two or more dispatch networks, reconcile the collected data and create inter-working invoices for the dispatch session, including roaming charges for the at least one roaming device.

9. The inter-working network of claim 8 wherein the signaling controller facilitates the storage of call data records, in a regional database, associated with a dispatch call between two or more of the dispatch networks, and wherein the billing clearinghouse uses the stored call detail records to create inter-working invoices.

10. The inter-working network of claim 8 wherein the media gateway facilitates the storage of usage detail reports associated with a dispatch group call between two or more of the dispatch networks, and wherein the billing clearinghouse uses the stored usage detail reports to create inter-working invoices.

11. The inter-working network of claim 10 wherein the border gateway facilitates the storage of usage detail reports associated with inbound and outbound traffic between the dispatch networks.

12. A method for monetizing inter-working disparate dispatch networks, each dispatch network providing dispatch services to a plurality of subscriber units, comprising the acts of:

receiving a dispatch session request from an originating dispatch network, the dispatch session request identifying a group of the subscriber units spanning a plurality of target dispatch networks, wherein the originating dispatch network is one of an integrated Dispatch Enhanced Network network and a high performance push-to-talk network, and wherein the plurality of target dispatch networks includes at least the other of the integrated Dispatch Enhanced Network network and high-performance push-to-talk network;

translating dispatch session messages received from the originating dispatch network into a common signaling format;

processing, in a point-of-presence, the dispatch session request, including allocating signaling and media resources;

forwarding the dispatch session request to a border gateway associated with each of the target dispatch networks;

translating the dispatch session messages from the common signaling format into a format compatible with each of the target dispatch networks;

facilitating the group session between roaming subscribers on the originating dispatch network and roaming subscribers on the target dispatch networks; and generating an invoice for each of the originating dispatch network and target dispatch networks, including charges for facilitating the group session.

13. The method of claim 12 wherein signaling resources are allocated in a plurality of points-of-presence, each point-of-presence generating dispatch call data records and usage data records for the group session.

14. The method of claim 12 wherein the signaling resources are allocated in a first point-of-presence and media resources are allocated in a second point-of-presence, each point-of-presence generating dispatch call data for the group session.

15. The method of claim 13 further comprising aggregating the generated dispatch call data and usage data for the group session and applying settlement logic to the aggregated dispatch call data to produce billing data for each of the originating dispatch network and the target dispatch networks.

16. The method of claim 14 wherein the settlement logic includes a set of criteria comprising at least one of a number of PTT button pushes requesting a session floor, a number of regions, a size of participating carriers, a group size for the session, a number of carriers involved in the session, a number of bytes transmitted, an identity of transcoding resources allocated, and an identity and duration of inter-working applications used.

17. The method of claim 15 further comprising:
receiving a request for an inter-working application; and
executing the inter-working application during the session, wherein the invoice includes charges for the use of the inter-working application.

* * * * *